US012158518B2

(12) United States Patent
Unnikrishnan et al.

(10) Patent No.: US 12,158,518 B2
(45) Date of Patent: Dec. 3, 2024

(54) RESOLUTION OF ELEVATION AMBIGUITY IN ONE-DIMENSIONAL RADAR PROCESSING

(71) Applicant: QUALCOMM Incorporated, San Diego, CA (US)

(72) Inventors: Jayakrishnan Unnikrishnan, Jersey City, NJ (US); Urs Niesen, Berkeley Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 16/734,779

(22) Filed: Jan. 6, 2020

(65) Prior Publication Data

US 2020/0217950 A1    Jul. 9, 2020

Related U.S. Application Data

(60) Provisional application No. 62/789,475, filed on Jan. 7, 2019.

(51) Int. Cl.
*G01S 13/89* (2006.01)
*G01S 7/295* (2006.01)
(Continued)

(52) U.S. Cl.
CPC ............. *G01S 13/89* (2013.01); *G01S 7/295* (2013.01); *G01S 7/417* (2013.01); *G01S 13/867* (2013.01)

(58) Field of Classification Search
CPC .......... G01S 13/89; G01S 7/295; G01S 7/417; G01S 13/867; G01S 13/931;
(Continued)

(56) References Cited

U.S. PATENT DOCUMENTS 9,667,235 B1 * 5/2017 Wyse ..................... H01P 1/18
10,090,600 B2 * 10/2018 Kirino ................... H01Q 13/24
(Continued)

FOREIGN PATENT DOCUMENTS

| CN | 108333588 A | * 7/2018 | ........... G01S 13/904 |
| DE | 102018101318 A1 | * 7/2018 | ........... G01S 13/865 |

OTHER PUBLICATIONS

Bilik I., et al., "Automotive MIMO Radar for Urban Environments", IEEE Radar Conference, 2016, 6 pages.
(Continued)

*Primary Examiner* — Olumide Ajibade Akonai
*Assistant Examiner* — Yonghong Li
(74) *Attorney, Agent, or Firm* — QUALCOMM Incorporated

(57) ABSTRACT

Systems and methods for resolving elevation ambiguity include acquiring, using a 1-D horizontal radar antenna array, a radar frame with range and azimuth information, and predicting a target elevation based on the frame by computing a depth map with a plurality of target depths assigned to corresponding azimuth-elevation pairs. Computing the depth map includes processing the radar frame with an encoder-decoder structured deep convolutional neural network (CNN). The CNN may be trained with a dataset including training radar frames acquired in a number of environments, and compensated ground truth depth maps associated with those environments. The compensated ground truth depth maps may be generated by subtracting a ground-depth from a corresponding ground truth depth map. The ground truth depth maps may be acquired with a 2-D range sensor, such as a LiDAR sensor, a 2-D radar sensor, and/or an IR sensor. The radar frame may also include Doppler data.

18 Claims, 13 Drawing Sheets

(51) Int. Cl.
  *G01S 7/41* (2006.01)
  *G01S 13/86* (2006.01)
(58) Field of Classification Search
  CPC .................. G01S 13/723; G01S 13/58; G01S 2013/9318; G01S 2013/93185; G01S 2013/9321; G01S 2013/93271; G01S 17/931; G01S 13/44; G01S 2013/9319; G01S 2013/9323; G01S 2013/93275; G01S 7/04
  USPC ........................................................ 342/195
  See application file for complete search history.

(56) References Cited

U.S. PATENT DOCUMENTS

| | | | | |
|---|---|---|---|---|
| 10,705,202 | B2* | 7/2020 | Nedjar | G01S 13/931 |
| 2008/0111731 | A1* | 5/2008 | Hubbard | G01S 13/872 342/160 |
| 2016/0054452 | A1* | 2/2016 | Cosatto | G01S 19/48 701/412 |
| 2018/0211128 | A1* | 7/2018 | Hotson | G01S 17/89 |
| 2019/0004535 | A1* | 1/2019 | Huang | G06N 3/045 |
| 2019/0050653 | A1* | 2/2019 | Natroshvili | G01S 17/50 |

OTHER PUBLICATIONS

Diewald F., et al., "Radar-Interference-Based Bridge Identification for Collision Avoidance Systems", IEEE Intelligent Vehicles Symposium (IV), 2011, Jun. 5-9, 2011, pp. 113-118.
Eigen D., et al., "Depth Map Prediction from a Single Image using a Multi-Scale Deep Network", Proc. NIPS, Jun. 2014, pp. 2366-2374.
Furukawa H., "Deep Learning for End-to-End Automatic Target Recognition from Synthetic Aperture Radar Imagery", The Institute of Electronics, Information and Communication Engineers, Jan. 2018, pp. 35-40.
Glorot X., et al., "Understanding the Difficulty of Training Deep Feedforward Neural Networks", 2010, pp. 249-256.
Hasch J., et al., "Driving Towards 2020: Automotive Radar Technology Trends", IEEE MTTS International Conference on Microwaves for Intelligent Mobility, 2015, 4 pages.
He K., et al., "Deep Residual Learning for Image Recognition", IEEE Conference on Computer Vision and Pattern recognition, 2016, pp. 770-778.
Hua Y., et al., "An L-Shaped Array for Estimating 2-D Directions of Wave Arrival", IEEE Transactions on Antennas and Propagation, vol. 39, No. 2, Feb. 1991, pp. 143-146.
International Search Report and Written Opinion—PCT/US2020/012632—ISA/EPO—Apr. 3, 2020.
Jokanovic B., et al., "Radar Fall Motion detection Using Deep Learning", IEEE Radar Conference, 2016, 6 pages.
Kingma D.P., et al., "ADAM: A Method for Stochastic Optimization", 2015, pp. 1-15.
Kuznietsov Y., et al., "Semi-Supervised Deep Learning for Monocular Depth Map Prediction", 2017, IEEE Conference on Computer Vision and Pattern Recognition, pp. 2215-2223.
Laribi A., et al., "A New Height-Estimation Method Using FMCW Radar Doppler Beam Sharpening", 25th European Signal Processing Conference, 2017, pp. 1932-1936.
Li B., et al., "Depth and Surface Normal Estimation form Monocular Images using regression on Deep features and Hierarchical CRFS", IEEE Conference on Computer Vision and Pattern Recognition (CVPR), 2015, pp. 1119-1127.
Liu F., et al., "Deep Convolutional Neural Fields for Depth Estimation from a Single Image", IEEE, 2015, pp. 5162-5170.
Liu M., et al., "Discrete-Continuous Depth Estimation from a Single Image", IEEE Conference on Computer Vision and Pattern Recognition, 2014, pp. 716-723.
Lombacer J., et al., "Detection of Arbitrarily Rotated Parked Cars Based on Radar Sensors", 16th International Radar Symposium (IRS), Jun. 2015, 6 pages.
Lombacher J., et al., "Potential of Radar for Static Object Classification using Deep Learning Methods", IEEE MTT-S International Conference on Microwaves for Intelligent Mobility (ICMIM), May 2016, 4 pages.
Lunden J., et al., "Deep Learning for HRRP-based Target Recognition in Multistatic Radar Systems", IEEE Radar Conference, 2016, 6 pages.
Murad M., et al., "Requirements for Next Generation Automotive Radars", 2013, IEEE Radar conference (Radarcon13), 6 pages.
Park J., et al., "Micro-Doppler Based Classification of Human Aquatic Activities via Transfer Learning of Convolutional Neural Networks", Sensors, 2016, vol. 16, E1990, 10 pages.
Ronneberger O., et al., "U-Net: Convolutional Networks for Biomedical Image Segmentation", May 18, 2015, pp. 234-241.
Saxena A., et al., "3-D Depth Reconstruction from a Single Still Image", International Journal of Computer Vision, 2008, vol. 76, pp. 53-69.
Schumann O., et al., "Semantic Segmentation on Radar Point Clouds", 21st International Conference on Information Fusion (Fusion), 2018, pp. 2179-2186.
Seyfioglu M.S., et al., "Deep Learning of Micro-Doppler Features for Aided and Unaided Gait Recognition", IEEE Radar Conference, 2017, pp. 1125-1130.
Simonyan K., et al., "Very Deep Convolutional Networks for Large-Scale Image Recognition", Vary Pattern Recognition, ICLR 2015, pp. 1-14.
Swindlehurst A.L., et al., "Azimuth/Elevation Direction Finding Using Regular Array Geometries", IEEE Transactions on Aerospace and Electronic Systems, vol. 29, No. 1, Jan. 1993, pp. 145-156.
Van Der Veen A.J., et al., "Azimuth and Elevation Computation in High Resolution DOA Estimation" IEEE Transactions on Signal Processing, vol. 40, No. 7, Jul. 1992, pp. 1828-1832.
Xu D., et al., "Multi-Scale Continuous CRFs as Sequential Deep Networks for Monocular Depth Estimation", IEEE Conference on Computer Vision and Pattern Recognition, 2017, pp. 161-169.
Yin Q.Y., et al., "Estimating 2-D angles of Arrival via Two Parallel Linear Arrays", IEEE, 1989, pp. 2803-2806.
Zhange L., et al., "Deep Learning for Remote Sensing Data", Advances in Machine Learning for remote Sensing and Geosciences, Jun. 13, 2016, pp. 22-40.

* cited by examiner (i) Radar (input)   (ii) Lidar (ground truth)   (iii) (Prediction)

(a)   (b)

RESOLUTION OF ELEVATION AMBIGUITY IN ONE-DIMENSIONAL RADAR PROCESSING

CROSS-REFERENCE TO RELATED APPLICATION

The present application for patent claims the benefit of U.S. Provisional Application No. 62/789,475, entitled "RESOLUTION OF ELEVATION AMBIGUITY," filed Jan. 7, 2019, assigned to the assignee hereof and expressly incorporated herein by reference in its entirety.

TECHNICAL FIELD

The various aspects and embodiments described herein relate generally to resolution of elevation ambiguity, and more particularly to radar systems and the like.

BACKGROUND

Current radar systems commonly use a one-dimensional (1-D) horizontal antenna array. The 1-D horizontal antenna array provides resolution in azimuth but not in elevation. However, radar systems that can resolve elevation information may be useful in a variety of applications, including advanced driver assistance systems (ADAS), Automated Driving Systems (ADS), visual inertial odometry systems (VIO), and other applications.

For example, modern motor vehicles are increasingly incorporating technologies that help drivers avoid drifting into adjacent lanes or making unsafe lane changes (e.g., Lane Departure Warning (LDW)), or that warn drivers of other vehicles behind them when they are backing up, or that brake automatically if a vehicle ahead stops or slows suddenly (e.g., Forward Collision Warning (FCW)), among other things. The continuing developments in automotive technology include objectives for even greater safety benefits, and ultimately for Automated Driving Systems (ADS) facilitating the entire task of driving without a need for the intervention of a human driver.

Six levels of human/machine interaction have been defined with regard to autonomous vehicle control. At Level 0, a human driver performs all of the driving. At Level 1, an Advanced Driver Assistance System (ADAS) of the vehicle can sometimes assist the human driver with either steering or braking/accelerating, but not both simultaneously. At Level 2, an ADAS of the vehicle can itself perform actual control of both steering and braking/accelerating simultaneously, under some circumstances, and the human driver must continue to apply full attention and perform any remaining driving tasks. At Level 3, an ADS of the vehicle can itself perform all aspects of the driving task, under some circumstances. Under those circumstances, the human driver must be ready to take back control at any time that the ADS requests the driver to do so. Under all other circumstances, the human driver performs the driving task. At Level 4, an ADS of the vehicle can itself perform all driving tasks and monitor the driving environment, essentially doing all of the driving, in certain situations. The human need not pay attention under those circumstances. At Level 5, an ADS of the vehicle can perform all the driving under all circumstances. The human occupants are mere passengers and need not be involved with any of the driving tasks.

These and other safety technologies employ a combination of hardware (sensors, cameras, and radar) and software to help vehicles identify various safety risks so as to warn a driver to act (in the case of ADAS), or to act autonomously (in the case of an ADS), to avoid unsafe situations. A vehicle outfitted with an ADAS or ADS may include one or more camera sensors mounted on the vehicle to capture images of a scene in front of the vehicle, as well as behind and to the sides of the vehicle. Radar systems may also be used to detect objects on and off the road on which the vehicle is traveling, as well as behind and to the sides of the vehicle. Radar systems utilize radio frequency (RF) waves to determine the range, direction, speed, and/or elevation of objects along the road. More specifically, a transmitter transmits pulses of RF energy that reflect from surfaces of objects in their path. Pulses reflected from object surfaces typically return a small part of the reflected energy to a receiver, which is often co-located with the transmitter. Similarly, camera and radar sensors are usually oriented to capture respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems often operate at insufficient resolution to identify important or useful features of the detected objects. Camera sensors, however, typically do provide adequate resolution object feature identification. Various cues extracted from the captured images regarding an object's shape and appearance may be sufficient for classification of the object. Further, given complementary properties of the two sensors, data from the two sensors can be combined (referred to as "fusion") in a single system for improved performance.

To further enhance ADAS and ADS systems, especially at Level 3 and above, autonomous and semi-autonomous vehicle control systems may utilize high definition (HD) map datasets, which contain significantly more detailed information and true-ground-absolute accuracy than those found in current conventional resources. Such HD maps may provide accuracy in the absolute range of 7-10 cm, as well as highly detailed inventories of stationary physical assets related to roadways, such as road lanes, road edges, shoulders, dividers, traffic signals, signage, paint markings, poles, and other data useful for the safe navigation of roadways and intersections by autonomous and semi-autonomous vehicles. HD maps may also provide electronic horizon predictive awareness, which informs the control systems of autonomous and semi-autonomous vehicles as to what lies ahead.

SUMMARY

The following summary is an overview provided solely to aid in the description of various aspects of the disclosure and is provided solely for illustration of the aspects and not limitation thereof.

Methods and apparatuses for resolving elevation ambiguity are disclosed. In an embodiment described herein, elevation ambiguity in one-dimensional (1-D) radar sensor data may be resolved by acquiring, from a radar sensor using a 1-D horizontal antenna array, a radar frame that includes at least range information and azimuth information, and predicting at least a target elevation based on the radar frame, where predicting a target elevation includes computing a depth map that includes a plurality of target depths, and a plurality of target depths is assigned to a corresponding plurality of azimuth-elevation pairs. Further, computing the depth map may include processing the radar frame with an encoder-decoder structured deep convolutional neural network (CNN), where the encoder-decoder structured deep CNN is trained using a dataset that may include a plurality of training radar frames acquired in one or more of a plurality of particular environments, and a plurality of compensated ground truth depth maps associated with the one or more of a plurality of particular environments. Each of the plurality of compensated ground truth depth maps may be generated by subtracting a ground-depth from a corresponding ground truth depth map of the plurality of ground truth depth maps, and the plurality of ground truth depth maps may be acquired using a two-dimensional (2-D) range sensor. In an embodiment, the 2-D range sensor includes a LiDAR sensor. In an embodiment, the 2-D range sensor includes a 2-D radar sensor. And, in an embodiment, the 2-D range sensor includes an infra-red (IR) sensor. In an embodiment, the radar frame further includes Doppler information.

In another embodiment, an apparatus includes at least one memory configured to store data and/or instructions, and at least one processor coupled to the at least one memory, where the at least one processor may be configured to acquire, from a radar sensor using a one-dimensional (1-D) horizontal antenna array, a radar frame that includes at least range information and azimuth information, and predict at least a target elevation based on the radar frame. The predicting may include computing a depth map, which may include a plurality of target depths assigned to a corresponding plurality of azimuth-elevation pairs. Computing the depth map may include processing the radar frame with an encoder-decoder structured deep convolutional neural network (CNN), where the encoder-decoder structured deep CNN may be trained using a dataset that includes a plurality of training radar frames acquired in one or more of a plurality of particular environments, and a plurality of compensated ground truth depth maps associated with the one or more of a plurality of particular environments. Each of the plurality of compensated ground truth depth maps may be generated by subtracting a ground-depth from a corresponding ground truth depth map of the plurality of ground truth depth maps, and the plurality of ground truth depth maps may be acquired using a two-dimensional (2-D) range sensor. In an embodiment, the 2-D range sensor includes a LiDAR sensor. In an embodiment, the 2-D range sensor includes a 2-D radar sensor. And, in an embodiment, the 2-D range sensor includes an infra-red (IR) sensor. In an embodiment, the radar frame further includes Doppler information.

Embodiments disclosed herein also provide for an apparatus that includes a means for acquiring, from a radar sensor using a one-dimensional horizontal antenna array, a radar frame that includes at least range information and azimuth information, and means for predicting at least a target elevation based on the radar frame. The means for predicting may include means for computing a depth map, where the depth map includes a plurality of target depths, and a plurality of target depths is assigned to a corresponding plurality of azimuth-elevation pairs. Computing the depth map may include processing the radar frame with an encoder-decoder structured deep convolutional neural network (CNN), where the encoder-decoder structured deep CNN may be trained with a dataset that may include a plurality of training radar frames acquired in one or more of a plurality of particular environments, and a plurality of compensated ground truth depth maps associated with the one or more of a plurality of particular environments. Each of the plurality of compensated ground truth depth maps may be generated by subtracting a ground-depth from a corresponding ground truth depth map of the plurality of ground truth depth maps, and the plurality of ground truth depth maps may be acquired using a two-dimensional (2-D) range sensor. In an embodiment, the 2-D range sensor includes a LiDAR sensor. In an embodiment, the 2-D range sensor includes a 2-D radar sensor. And, in an embodiment, the 2-D range sensor includes an infra-red (IR) sensor. In an embodiment, the radar frame further includes Doppler information.

Embodiments disclosed herein also provide for a non-transitory computer-readable medium comprising code, which, when executed by a processor, causes the processor to perform operations to resolve elevation ambiguity in 1-D radar sensor data, the non-transitory computer-readable medium including code for acquiring, from a radar sensor using a 1-D horizontal antenna array, a radar frame that includes at least range information and azimuth information, and code for predicting at least a target elevation based on the radar frame. The code for predicting may include code for computing a depth map, where the depth map includes a plurality of target depths, and a plurality of target depths is assigned to a corresponding plurality of azimuth-elevation pairs. Computing the depth map may include the use of code for processing the radar frame with an encoder-decoder structured deep convolutional neural network (CNN), where the encoder-decoder structured deep CNN may be trained using a dataset that may include a plurality of training radar frames acquired in one or more of a plurality of particular environments, and a plurality of compensated ground truth depth maps associated with the one or more of a plurality of particular environments. The plurality of compensated ground truth depth maps may be generated by subtracting a ground-depth from a corresponding ground truth depth map of the plurality of ground truth depth maps, and the plurality of ground truth depth maps may be acquired using a two-dimensional (2-D) range sensor.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information, elements, and components, described below may be represented using any of a variety of different technologies and techniques. For example, data, instructions, commands, information, signals, bits, symbols, and chips, that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
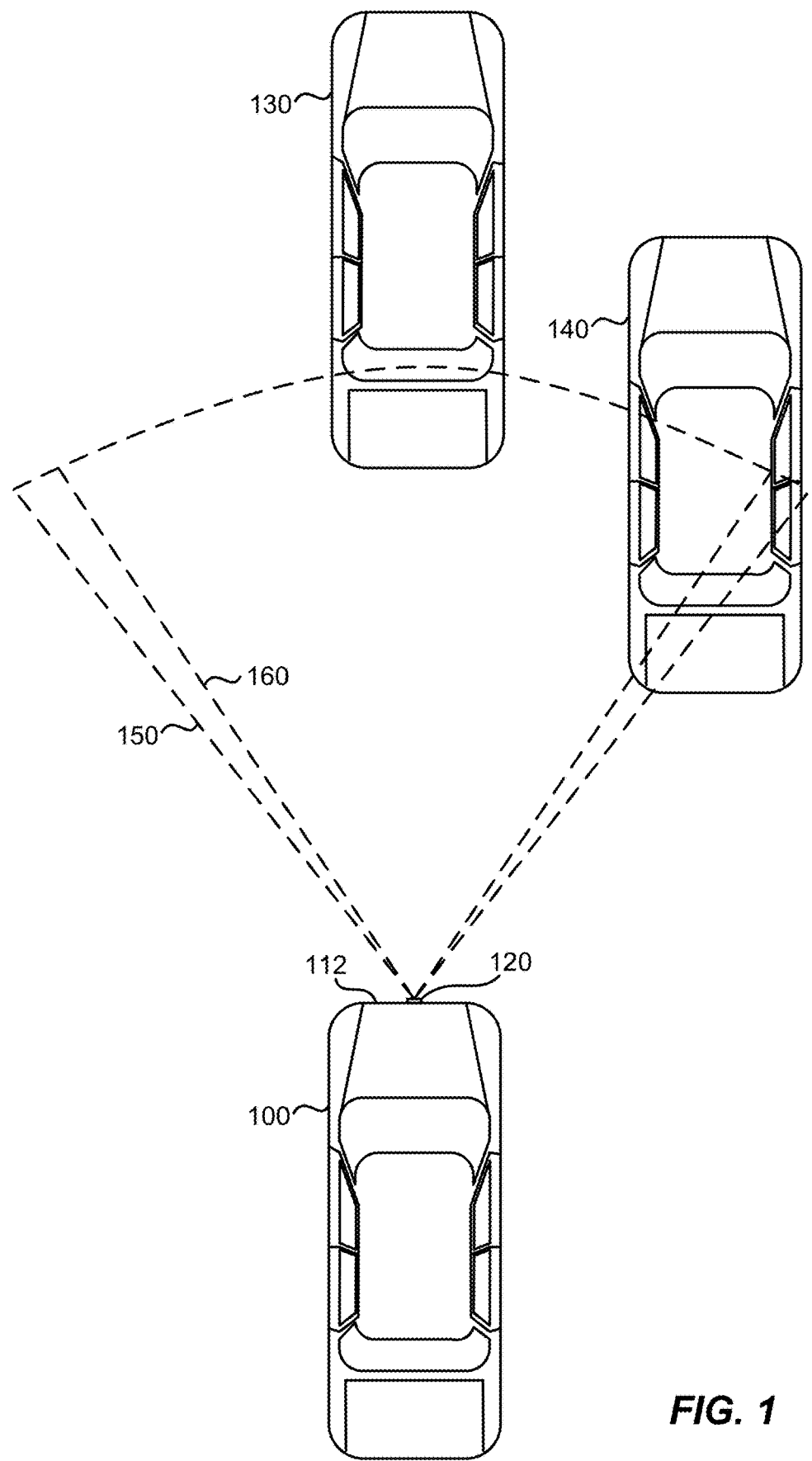
FIG. 1 is a top view of a vehicle employing an integrated radar-camera sensor at the front bumper, according to various aspects of the disclosure.

Referring to FIG. 1, a vehicle 100 is illustrated, which includes a radar-camera sensor module 120 located in the interior compartment of the vehicle 100 on or located on, or inset into, the front bumper 112. The radar-camera sensor module 120 may include a radar sensor component configured to transmit radar signals from the location on the bumper 112 in a horizontal coverage zone 150 (shown by dashed lines), and receive reflected radar signals that are reflected from any objects within the coverage zone 150. The radar-camera sensor module 120 may further include a camera component for capturing images based on light waves seen and captured at the bumper 112 in a horizontal coverage zone 160 (shown by dashed lines).

FIG. 1 illustrates an example in which a radar sensor component and a camera component may be co-located in a shared housing, or, as will be appreciated, may be separately housed at different locations on or inside the vehicle 100. For example, the camera may be located as shown in FIG. 1, and the radar sensor may be located in the grill or front bumper of the vehicle 100. Additionally, although FIG. 1 illustrates the radar-camera sensor module 120 located at the front bumper 112, it may instead be located in a rooftop sensor array, or elsewhere. Further, although FIG. 1 illustrates only a single radar-camera sensor module 120, as will be appreciated, the vehicle 100 may have multiple radar-camera sensor modules 120 trained in different directions (to the vehicle's sides, front, rear, etc.). The various radar-camera sensor modules 120 may be under the "skin" of the vehicle (e.g., inset into the bumper 112, door panels, other bumpers, grills, etc.), or within a rooftop sensor array.

The radar-camera sensor module 120 may detect one or more objects relative to the vehicle 100. In the example of FIG. 1, there are two objects, vehicles 130 and 140, within the horizontal coverage zones 150 and 160 that the radar-camera sensor module 120 can detect. The radar-camera sensor module 120 may estimate parameters relating to the detected object(s), such as a position, range, direction, speed, size, classification (e.g., vehicle, pedestrian, road sign, etc.), and the like. The radar-camera sensor module 120 may be employed onboard the vehicle 100 for automotive safety applications, such as adaptive cruise control (ACC), forward collision warning (FCW), collision mitigation or avoidance via autonomous braking, lane departure warning (LDW), and the like.

Co-locating the camera and radar sensor allows these components to efficiently share electronics and signal processing. In particular, co-locating may enable early radar-camera data fusion. For example, the radar sensor and camera may be integrated onto a single board. A joint radar-camera alignment technique may be employed to align both the radar sensor and the camera. However, co-location of the radar sensor and camera is not required to practice the techniques described herein.

Figure 2:
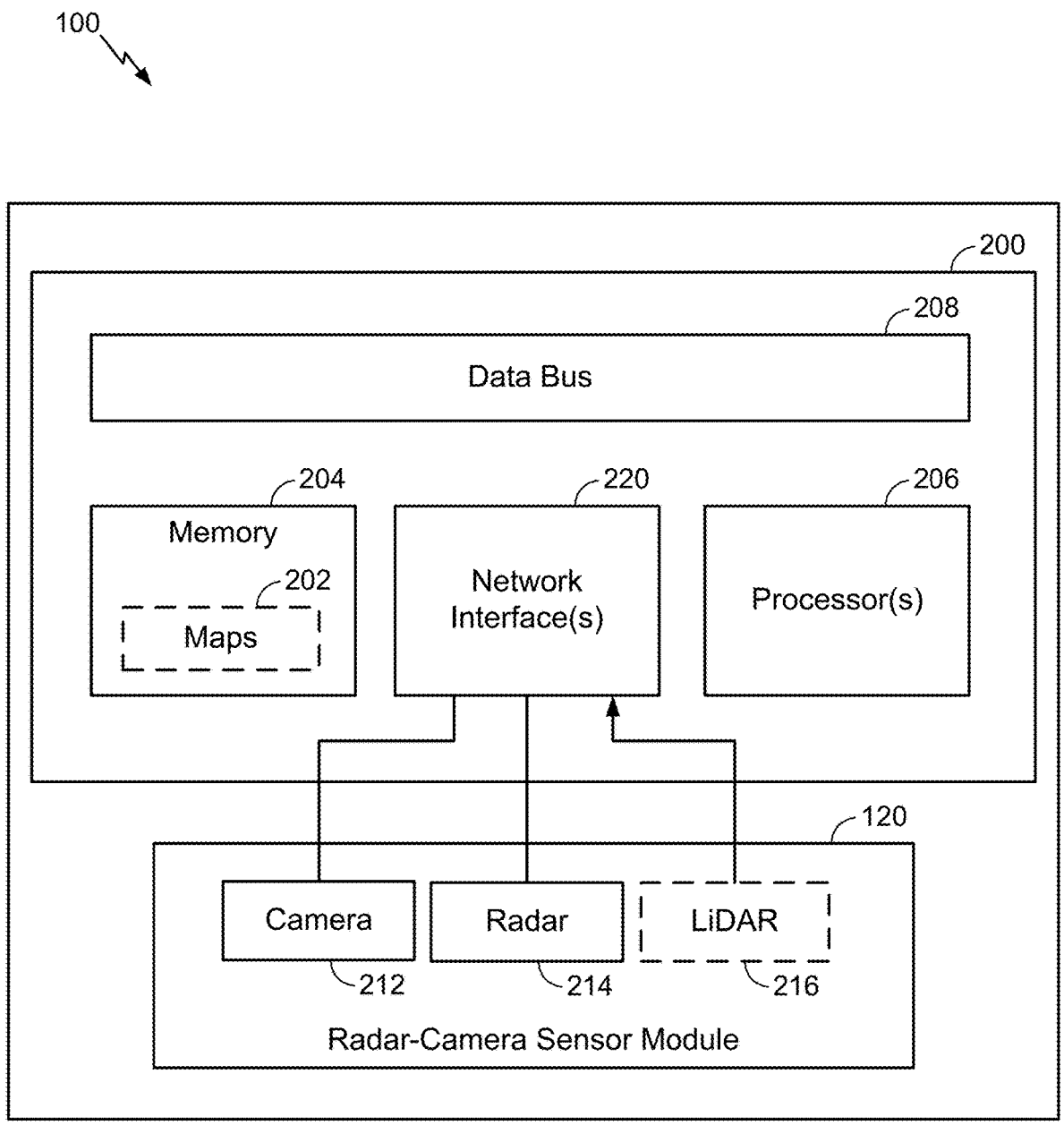
FIG. 2 illustrates an on-board computer architecture, according to various aspects of the disclosure.

FIG. 2 is a functional block diagram illustrating an on-board computer (OBC) 200 of a vehicle 100, according to various aspects. In an aspect, the OBC 200 may be part of an ADAS or ADS. The OBC 200 may include a non-transitory computer-readable storage medium, i.e., memory 204, and one or more processors 206 operatively coupled and in communication with the memory 204 via a data bus 208. The memory 204 may include one or more storage modules for storing computer-readable instructions executable by the processor(s) 206 to perform the functions of the OBC 200 described herein.

One or more radar-camera sensor modules 120 are coupled to the OBC 200 (only one is shown in FIG. 2 for simplicity). In accordance with some aspects, the radar-camera sensor module 120 may include at least one camera 212, at least one radar sensor 214, and an optional Light Detection and Ranging (LiDAR, lidar) sensor 216. The OBC 200 may also include one or more network interfaces 220 connecting the processor(s) 206, by way of the data bus 208, to the radar-camera sensor module 120, other vehicle subsystems (not shown), and in some cases, wireless communication networks (not shown), such as wireless local area networks (WLANs), global positioning systems (GPS) networks, cellular telecommunication networks, and the like.

In an aspect, the OBC 200 may utilize network interfaces 220 to download one or more maps 202 that may then be stored in memory 204 and used for vehicle navigation. Map(s) 202 may include one or more high definition (HD) maps, which may provide accuracy in the absolute range of 7-10 centimeter (cm), detailed inventories of stationary physical assets related to roadways, such as road lanes, road edges, shoulders, dividers, traffic signals, signage, paint markings, poles, and other data useful for the safe navigation of roadways and intersections by vehicle 100. Map(s) 202 may also provide electronic horizon predictive awareness, which enables the vehicle 100 to know what lies ahead.

In an aspect, camera 212 may capture image frames of a scene within the viewing area of camera 212 (illustrated in FIG. 1 as horizontal coverage zone 160), at some periodic rate. Likewise, radar sensor 214 may capture radar frames of the scene within the viewing area of the radar sensor 214 (illustrated in FIG. 1 as horizontal coverage zone 150), at some periodic rate. The periodic rates at which camera 212 and radar sensor 214 capture their respective frames may be the same or different. Each camera and radar frame may be timestamped, however, so where the periodic capture rates are different, the timestamps can be used to select simultaneously, or nearly simultaneously, captured camera and radar frames for further processing (e.g., fusion).

Figure 3:
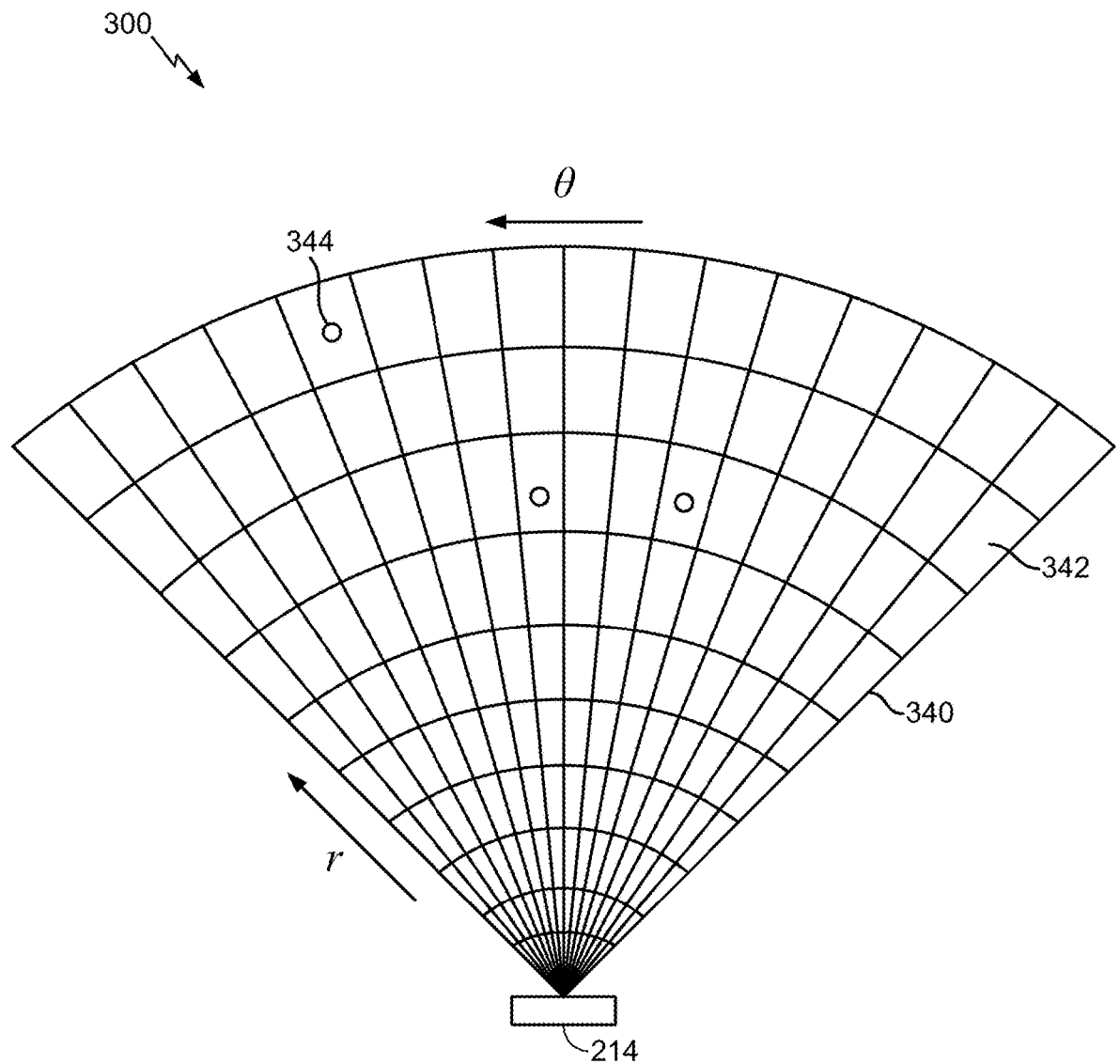
FIG. 3 is a schematic of a sensed occupancy radar grid, according to various aspects of the disclosure.

FIG. 3 illustrates an example of a sensed occupancy radar grid 300. A transmitter (e.g., an array of transmit antennas) of the radar sensor 214 may generate an electromagnetic field in the direction in which the transmitter is pointed (e.g., horizontal coverage zone 150). More specifically, the transmitter may transmit pulses of RF waves which reflect from surfaces of objects in the transmission path of the RF waves, such as vehicles 130 and 140 in FIG. 1. A portion of the energy of the reflected RF waves may be received at a receiver (e.g., an array of receive antennas) of the radar sensor 214, which may be co-located with the transmitter of the radar sensor 214.

In an aspect, the radar sensor 214 may be an imaging radar sensor that may facilitate beamforming horizontal and/or vertical scanning. Beamforming is a technique for creating an effective direction for a radar beam by altering the delays between different transmitting antennas so that the signals add constructively in the specified direction. Thus, the radar sensor 214 may scan horizontally and/or vertically across the sensing area (e.g., horizontal coverage zone 150) by using a transmitter comprising an array of electronically steered antennas.

As shown in FIG. 3, the electromagnetic field generated by the radar sensor 214 may be characterized as an occupancy grid 340 having a plurality of observation cells 342. Features 344 are extracted from the cells 342 to determine whether the feature 344 is an object (e.g., a vehicle 130/140). Each feature 344 within a respective cell 342 may typically be identified with up to four parameters: range, Doppler, azimuth, and elevation. As an example, a feature 344 within a cell 342 may be the signal-to-noise ratio (SNR) computed by a constant false alarm rate (CFAR) algorithm. However, it should be understood that other methods may be used to target and identify features 344 within a cell 342.

The processor(s) 206 may generate four dimensional (4D) tensors describing features 344 within cells 342 of the occupancy grid 340 detected by the radar sensor 214. The generated tensors may represent, for example, a range (distance from the vehicle 100 to the detected feature 344), an azimuth (the horizontal distance between a feature 344 and a reference RF ray emitted by the radar sensor 214, such as the initial RF ray of a radar sweep), a Doppler value (indicating the speed of the detected feature 344), and an elevation (vertical direction from the radar sensor 214 to the detected feature) for each detected feature 344. The processor(s) 206 may then perform object detection, object classification, localization, and property estimation, based on the tensors and undistorted camera frames received from the camera 212.

Figure 4:
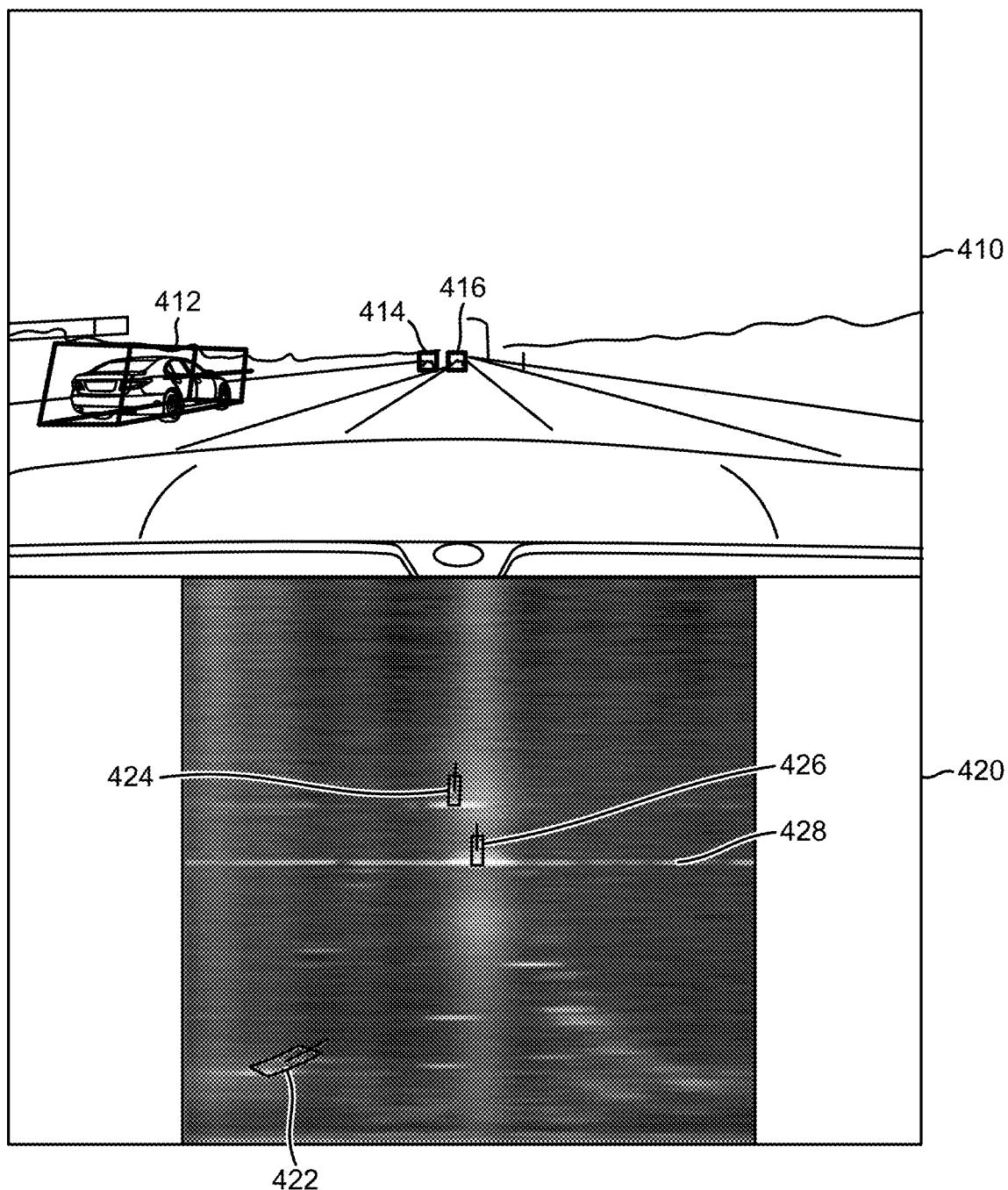
FIG. 4 illustrates a comparison between an example camera frame and example radar frame, according to various aspects of the disclosure.

FIG. 4 illustrates an image pair 400 including a camera image 410 and a radar image 420 of the same scene. The camera image 410 may have been captured by the camera 212, and the radar image 420 may have been captured by the radar sensor 214. The camera 212 captures raw camera frames of the scene within the viewing area of the camera 212 (as illustrated in FIG. 1 as horizontal coverage zone 160). The processor(s) 206 may correct distortions in the raw camera frames to generate undistorted camera frames for processing in conjunction with radar tensors. The camera image 410 is an example of an undistorted camera frame. Note that the terms "frame" and "image" may be used interchangeably herein.

The radar image 420 may be captured and processed as discussed above with regard to FIG. 3. The camera image 410 and the radar image 420 may then be processed to identify objects within the respective images, as discussed above with regard to FIG. 3. Object detection in camera images is well-known and, for brevity, is therefore not further elaborated herein.

The results of object detection may include various attributes of the detected object(s), including bounding boxes in Cartesian x-y(-z) coordinates enclosing the object(s). In the camera image 410, three objects are detected and surrounded by a bounding box 412, 414, and 416. In the radar image 420, the same three objects are detected and surrounded by bounding boxes 422, 424, and 426. As seen in FIG. 4, the shapes of the bounding boxes 422, 424, and 426, in the radar image 420 are of different sizes and shapes, which are based on their distance from the radar sensor (e.g., radar sensor 214). For example, the bounding box associated with a closer object (bounding box 422) is larger than the bounding boxes associated with farther objects (bounding boxes 424 and 426). This is due primarily to reception at the radar sensor 214 of fewer reflected radio waves resulting from the greater distance between the radar sensor 214 and the further objects.

When one or more objects have been identified in the camera image 410, the processor(s) 206 may use pattern-recognition algorithms to classify the object(s) as road signs, traffic barrels, cars, trucks, motorcycles, bicyclists, and pedestrians, among other examples.

The finer pixel resolution of an optical image enables relatively precise angular localization of recognized objects. Further, range may be estimated from stereo disparity if two or more cameras are used. Otherwise, a monocular system may estimate range from expected object size or displacement from the horizon. Object classification for radar images is more difficult, and often relies on correlating an object detected in the radar image (e.g., radar image 420) to an object detected in a corresponding (i.e., simultaneously, or nearly simultaneously, captured) camera image (e.g., camera image 410).

More specifically, the radar sensor 214 may provide reasonably accurate measurements of object distance and velocity in various weather conditions. However, radar systems typically have insufficient resolution to identify other features of the detected object. By contrast, the camera 212 may provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Further, recent advances in machine-learning techniques have made object-classification systems for both camera images and radar images much more effective. For example, deep neural networks (mathematical functions with many layers of nodes that resemble the connectivity of brain neurons) are now practical to train due to recently developed algorithms and the availability of "big data" image sets. Complex mathematics may now be applied to every pixel in a video/radar stream in real time due, among other things, to what may be regarded as miniature supercomputers comprising inexpensive graphics processing units (GPUs) originally developed for gaming on personal computers.

Figure 5:
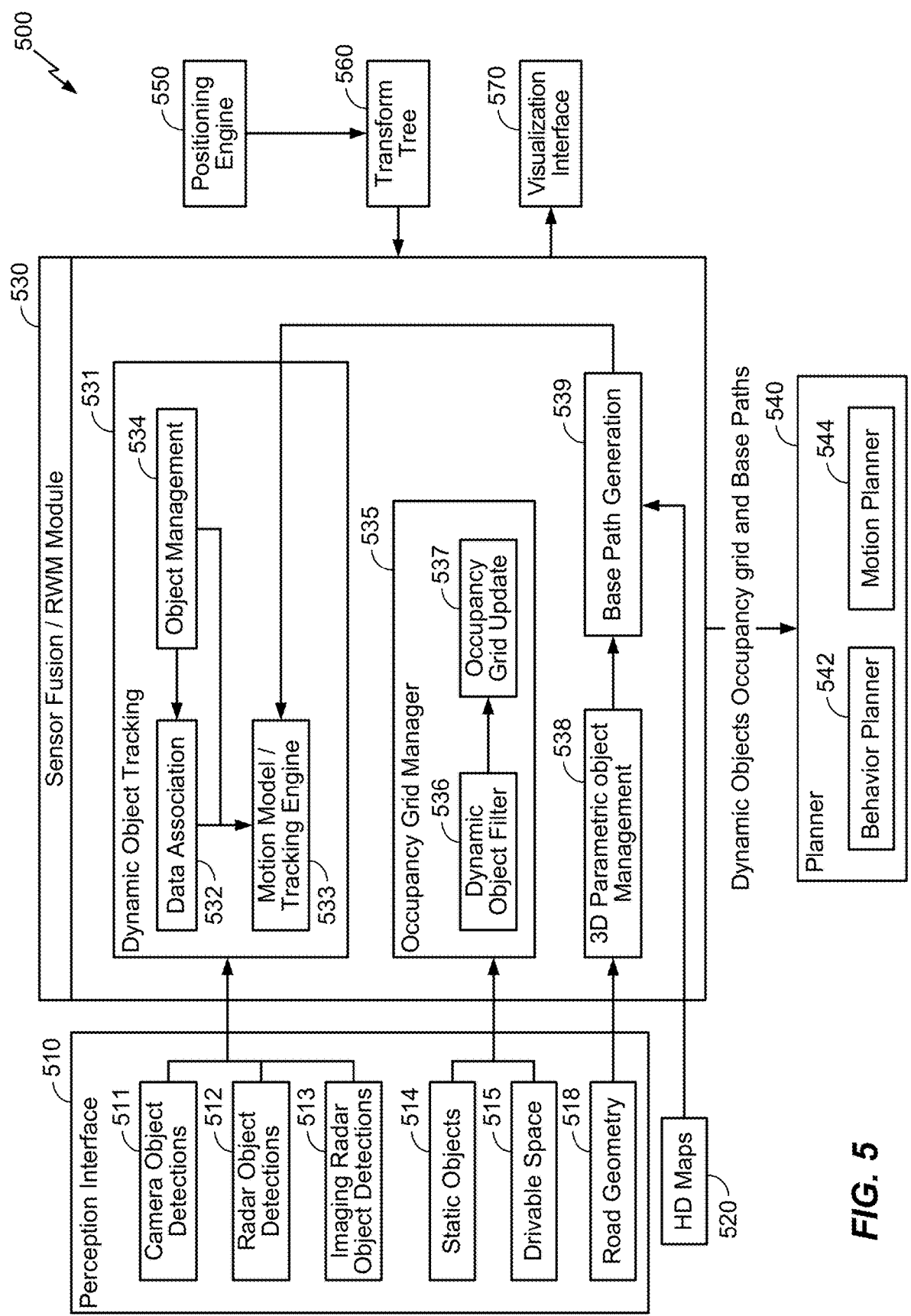
FIG. 5 illustrates an example sensor fusion architecture, according to aspects of the disclosure.

FIG. 5 illustrates an example sensor fusion architecture 500, according to aspects of the disclosure. In an aspect, the sensor fusion architecture 500 may be implemented at a radar-camera sensor module 120 and/or an OBC 200 of FIG. 2. A perception interface 510 of the sensor fusion architecture 500 provides inputs to a sensor fusion/real world model (RWM) module 530. In the example of FIG. 5, the perception interface 510 includes camera object detections 511 (e.g., detected based on data from the camera 212), radar object detections 512 (e.g., detected based on data from the LiDAR sensor 216), and imaging radar object detections 513 (e.g., detected based on data from the radar sensor 214). The perception interface 510 also includes information about static objects 514, drivable space 516, and road geometry 518. The information about static objects may be bounding box information, the same as for vehicles. Information about drivable space may include a per pixel label indicating whether that pixel is drivable or not. Additionally, or alternatively, drivable space may be assigned to regions of pixels. The information about road geometry may be a spline representation of the lane boundaries, for example.

In the example of FIG. 5, the sensor fusion/RWM module 530 of the sensor fusion architecture 500 includes a dynamic object tracking module 531 that includes a data association module 532, a motion model/tracking engine 533, and an object management module 534. The data association module 532 identifies which target vehicle(s) in previous camera/radar frames are matched to currently detected vehicle(s) and associates them with each other across the camera/radar frames. The dynamic object tracking module 531 receives the camera object detections 511, radar object detections 512, and imaging radar object detections 513 from the perception interface 510 and generates dynamic object detections (e.g., detections of moving objects, including their path, speed, rotation, etc.). The sensor fusion/RWM module 530 also includes an occupancy grid manager module 535 that includes a dynamic object filter module 536 and an occupancy grid update module 537. The occupancy grid manager module 535 receives the information about the static objects 514 and the drivable space 516 from the perception interface 510 and generates occupancy grid information (e.g., which grid boxes are occupied and which are open). Finally, the sensor fusion/RWM module 530 includes a 3-D parametric object management module 538 and a base path generation module 539 that receive as input information about the road geometry 518 and HD maps 520 (e.g., map(s) 202), respectively, and outputs base paths (e.g., the center-of-the-lane path that the host vehicle and/or nearby vehicles are expected to follow).

The sensor fusion architecture 500 also includes a positioning engine 550 (e.g., a GPS, motion sensors (e.g., accelerometer, gyroscope, etc.), etc.) and a transform tree module 560 that provide further inputs to the sensor fusion/RWM module 530.

The sensor fusion/RWM module 530 outputs the dynamic object detections, occupancy grid, and base paths to a planner module 540 of the sensor fusion architecture 500. The planner module 540 includes a behavior planner module 542 and a motion planner module 544 that direct other systems (e.g., braking, accelerations, steering, cruise control, signaling, etc.) of the host vehicle (e.g., vehicle 100) to act (e.g., brake, accelerate, change lanes, etc.) based on the information about the dynamic objects, the occupancy grid, and the base paths received from the sensor fusion/RWM module 530. The sensor fusion/RWM module 530 also outputs to a visualization interface 570. The visualization interface 570 may be connected to a display (e.g., light emitting diode (LED) display, liquid crystal display (LCD), etc.) within the host vehicle (e.g., vehicle 100), such as on the dashboard or behind the steering wheel, to provide information to a driver or occupant within the vehicle.

Although the sensor fusion architecture 500 shown in FIG. 5 is primarily directed to reacting to events (e.g., other vehicles changing lanes, turning onto the roadway, braking, etc.) that may occur while the vehicle is driving, as will be appreciated, the sensor fusion architecture 500 may also receive input from a driver of the vehicle (e.g., direction to change lanes, turn, etc.) and act on those instructions based on the information generated by the sensor fusion/RWM module 530. For example, in the case of an instruction to change lanes, the sensor fusion architecture 500 may first determine that there is a lane to change into and that there are no vehicles in it before the planner module 540 directs the vehicle to change lanes as instructed.

Figure 6:
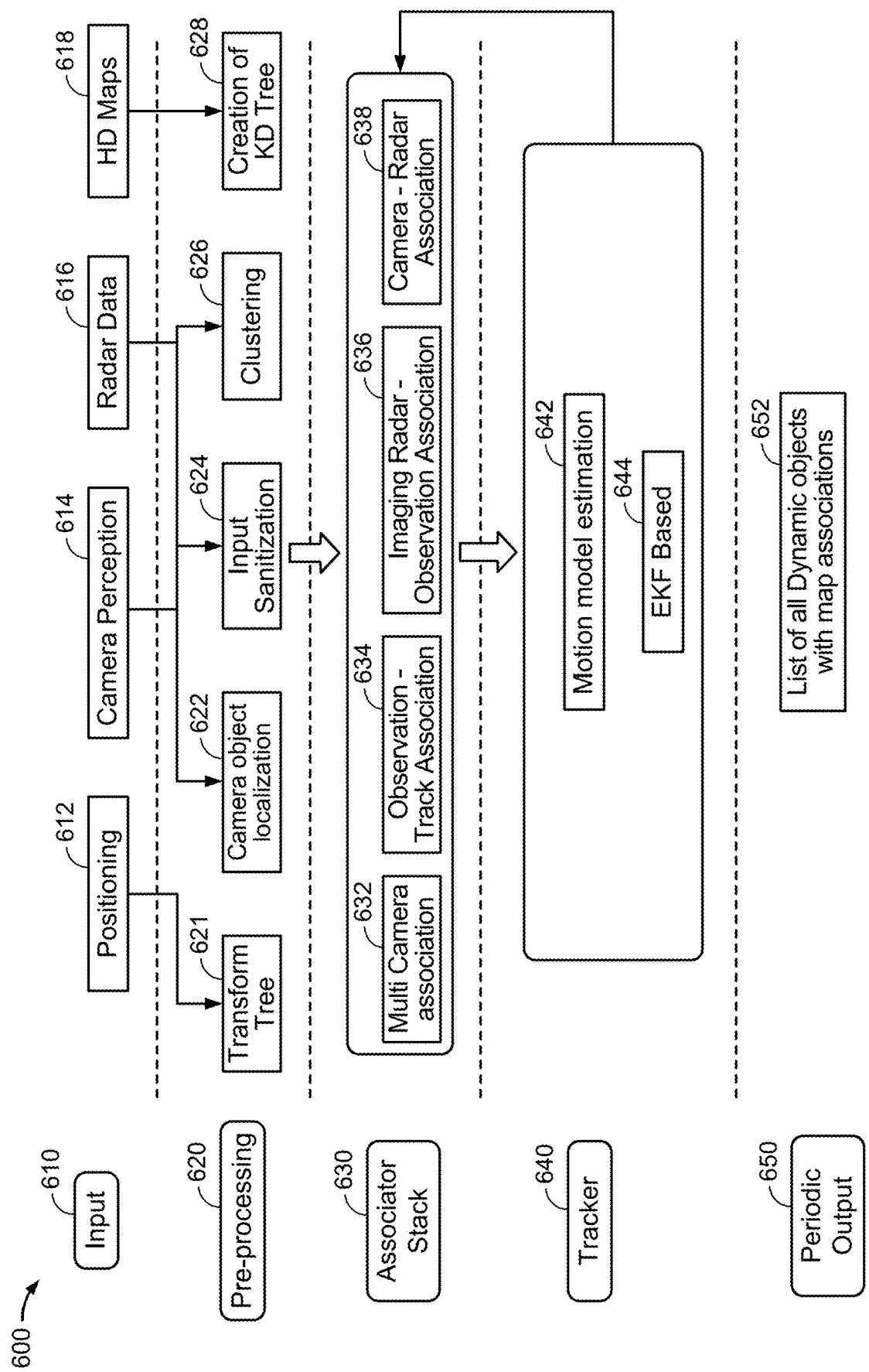
FIG. 6 illustrates an example object tracking architecture, according to aspects of the disclosure.

FIG. 6 illustrates an exemplary object tracking architecture 600, according to aspects of the disclosure. In an aspect, the object tracking architecture 600 may be implemented by a radar-camera sensor module 120 and/or an OBC 200 of FIG. 2, and, more specifically, a dynamic object tracking module 531 such as that of the sensor fusion/RWM module 530 in FIG. 5. At an input stage 610, the object tracking architecture 600 receives as input positioning information 612 (e.g., GPS information), camera perception information 614 (e.g., camera images from camera 212), radar data 616 (e.g., radar frames from radar sensor 214), and HD maps 618 (e.g., HD maps 520).

At a pre-processing stage 620, the object tracking architecture 600 may create a transform tree 621 (a binary tree representation of multiple coordinate frames as nodes, and links storing the transformation matrix to move from one coordinate frame to another) from the positioning information 612. The pre-processing stage 620 may perform camera object localization 622, input sanitization 624, and clustering operations on the camera perception information 614 and radar data 616. The pre-processing stage 620 may use the HD maps 618 for creation of a k-D tree 628 (a space-partitioning data structure for organizing points in a k-dimensional space).

At an associator stack stage 630, the object tracking architecture 600 may generate multi-camera associations 632, observation track associations 634, imaging radar observation associations 636, and camera radar associations 638. At a tracker stage 640, the object tracking architecture 600 may perform motion model estimation 642 and an extended Kalman filter (EKF) based solution 644 (discussed further below, and referred to as an "EKF tracker"). Finally, at a periodic output stage 650, the object tracking architecture 600 may output a list of all dynamic objects with respective map associations 652. This information may then be fed to the planner module 540 in FIG. 5.

At the preprocessing stage 620, input data coming into the sensor fusion module (e.g., sensor fusion/RWM module 530) may be noisy and need further preprocessing before being sent to the associator stack stage 630 and the estimation pipeline in the sensor fusion module. Accordingly, the present disclosure provides various techniques for sanitizing the input data at the input sanitization 624 level. Additionally, some of the inputs are processed to estimate additional quantities that can then be later used in the association and estimation pipeline.

General preprocessing includes observation-to-map lane association. At this stage, sensor observations mainly from the radar (e.g., radar 214) and the camera (e.g., camera 212) are associated with a specific waypoint on an HD map (e.g., HD map 520). HD maps are high-resolution maps with lane-level precision and waypoints with separation in a range of about 7-30 meters (m). Radar observations may be obtained in the form of pings having range and azimuth information. Camera observations may be obtained from a neural network producing a bounding box around a two-dimensional object detected in the image plane. The steps to associate these observations to the HD map may be, for example, as described in the following.

An HD map may contain two sets of points. One set of points form the lane center line (the section of the lane along which the vehicle can drive) and another set of points forms boundaries to the lane (which also separate and distinguish the lane). Adjacent points on the lanes are connected, and points are grouped into connected segments.

These sets of map points are fed into a k-dimensional tree structure facilitating efficient searches. As a preprocessing step, the lane width at each of the lane center points is calculated and each of the lane center points is associated with a set of two boundary points (one left and one right boundary).

When a reflected radar pulse is received, the system converts the pulse's range and azimuth measurement into a 3-D location on the surface of the earth. This 3-D location is then fed to the k-dimensional tree to identify close neighbors to the 2-D point. The search may return up to 20 potential candidate points with which this radar pulse may be associated. These 20 points may then be filtered and associated to the pulse using following criteria including (a) the perpendicular distance (distance in the orthogonal direction to the direction of travel) between the radar pulse and the lane center line returned must be less than half the lane width (calculated above), (b) the parallel distance (the distance along the direction of travel) between the pulse and the lane center line must be greater than 0 and less than the distance between two consecutive waypoints, and (c) if multiple points match the above two criteria, then the point with the closest perpendicular distance may be selected.

When an observation from a camera is received, it typically contains information about the detected object's location in the image plane, but without information regarding distance from the camera. To associate a camera observation, a different approach is taken. Instead of bringing the observation into the Earth coordinate system, the map is transformed from the Earth coordinate system to the camera image plane.

Map points with 3-D locations based in the Earth coordinate system are first projected into the camera frame, using predetermined transformations. If the observation is from a forward or backward facing camera, an association may be performed as follows. (a) The bottom edge of the bounding box is obtained from the observation, and the association may be determined by the locations at which the edge intersects with the lane center line on the image plane. (b) If that association should fail, the bottom edge may be extended to intersect with all of the lane center lines, after which boundary points associated with those lane center lines (as determined above) may be located. An association may then be obtained by determining which two boundary points encompass the midpoint of the bottom edge of the observation.

If the observation is from a camera that is facing to the left or the right of the ego vehicle, the observation may be associated as follows. (a) The bottom edge of the bounding box may be obtained, the midpoint of the bottom edge calculated, the parallel distance between the midpoint and the projected points calculated, and potential candidates filtered by ensuring that the parallel distance is greater than 0 and that the midpoint is in between the current point and its subsequent point. If multiple candidates are left, then the point whose lane center line passes in between the top and bottom edges of the bounding box may be selected.

In some implementations, the radar sensor 214 depicted in FIG. 2 may comprise a 1-D horizontal antenna array. A well-known problem for such systems is detecting objects that can be driven under or over. These include objects above the ground, such as overhead road signs, bridges, and overpasses, and low objects on the road surface, such as manhole covers and Botts dots (raised ceramic pavement markers). With conventional radar processing, it is difficult to distinguish between radar returns from such objects and from those of vehicles or other obstacles. If elevation information can be extracted from the radar returns, however, the distinctions become more apparent.

Elevation information can also aid in differentiating a single tall object, such as a truck, from multiple shorter objects, such as cars, in the same azimuth direction, where radar returns may merge to appear as a single object. Elevation information can readily disambiguate such scenarios. Such differentiation is crucial in sensor fusion systems when returns from multiple sensors are combined for measurement-track association and track estimation.

As discussed in greater detail herein, retrieval of 2-D arrival directions (azimuth and elevation) from a single 1-D antenna array may, in fact, be possible if rich prior information ("priors") about the scene is taken into account to exploit subtle elevation cues hidden in the radar signal. Several such priors and cues exist. For example, as seen through a forward-facing radar mounted on a vehicle, certain structures and objects (such as median dividers, roadside embankments, cars, trucks, etc.) may be expected to be visible in specific areas of the field of view. Also, objects on the road at a greater range tend to resolve to a higher detected elevation, and radar returns of taller targets tend to have greater energy. These and other suitable elevation cues are difficult to formally model, thus ruling out most traditional model-based approaches. By contrast, the present disclosure is directed to a machine-learning-based approach, in which the relevant elevation cues are learned from a large dataset. As an example, a development dataset includes over two-hundred thousand radar frames collected in highway environments. More specifically, the present disclosure is directed to an encoder-decoder structured deep convolutional neural network (CNN) that is trained using such a dataset. The neural network may receive a radar frame as its input, generally including range, azimuth, and Doppler information, about the scene. The output of the neural network may consequently predict a depth map, which assigns a target depth to each of a plurality of azimuth-elevation pairs. Thus, the neural network may be trained to resolve both azimuth and elevation. A depth map produced by a lidar sensor may be used for ground-truth comparison of the neural network predictions.

Figure 7:
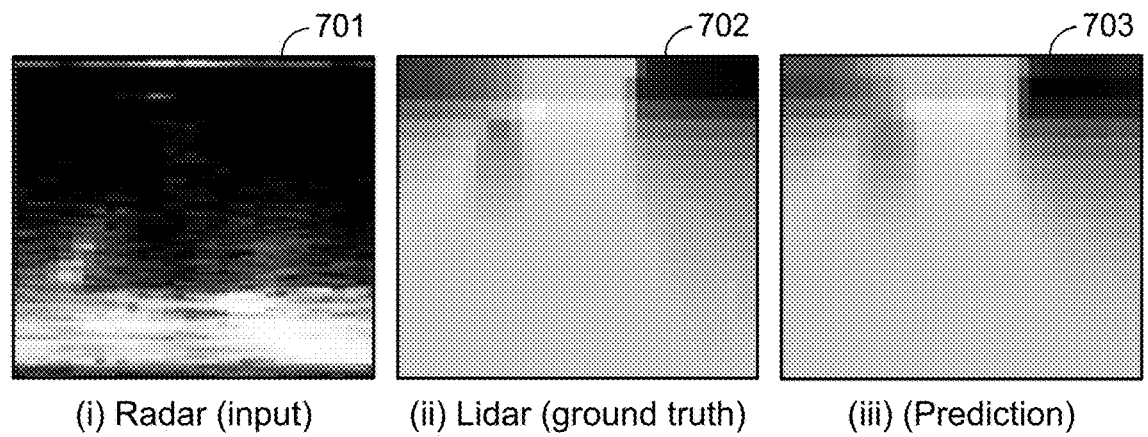
FIG. 7 illustrates an example of a radar frame input, a corresponding LIDAR map, and a predicted target depth map that is comparable to the LIDAR map.

FIG. 7 illustrates an exemplary implementation in accordance with aspects of the disclosure showing a particular radar frame input 701, a lidar depth map 702, and a predicted target depth map 703 that is comparable to the lidar depth map 702.

The radar frame input 701 may be captured using the radar sensor 214 depicted in FIG. 2. In an example scenario, the radar sensor 214 may be a 1-D antenna array, for example, a horizontal 1-D antenna array. The radar frame input 701 may include a two-dimensional array having range information in a first dimension and azimuth information in a second dimension. In accordance with aspects of the disclosure, the radar frame input 701 may be used to generate the predicted target depth map 703.

As will be understood from FIG. 7, a predicted target depth map 703 is comparable to a lidar depth map 702, which represents a ground-truth reading of the environment captured in the radar frame input 701. The lidar depth map 702 may be similar to what might be captured by the LiDAR sensor 216 described above, if the LiDAR sensor 216 were incorporated into the vehicle 100. However, it will be understood that even when the LiDAR sensor 216 may be omitted from the vehicle 100, a depth map similar to the predicted target depth map 703 may be generated in accordance with aspects of the disclosure.

In this example implementation, the environment includes a truck to the right, a car to the left, and a roadside embankment to the far left. As will be understood from the lidar depth map 702, these environmental elements may be represented by darker regions. As will be further understood from the predicted target depth map 703, these same environmental elements can be distinguished by processing the radar frame input 701 in accordance with aspects of the disclosure.

Figure 8:
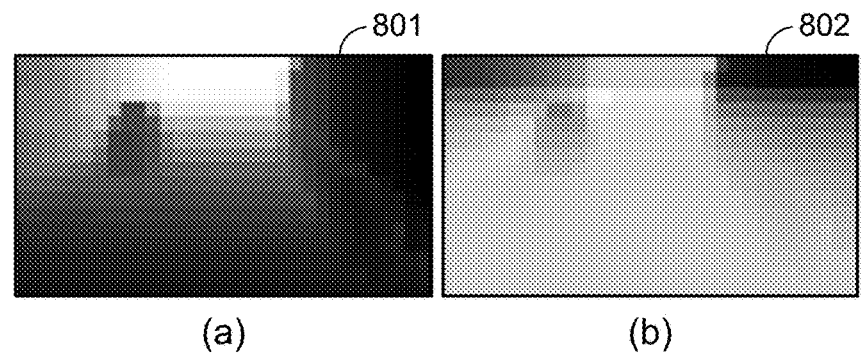
FIG. 8 illustrates an example implementation showing a pair of LIDAR depth maps, before and after a ground-depth subtraction.

FIG. 8 illustrates an example implementation of a pair of lidar depth maps 801, 802 before and after a ground-depth subtraction. The example lidar map 801 may represent an acquired lidar map (using, for example, the LiDAR sensor 216). The example lidar map 802 represents the example lidar map 801 after it is subjected to ground-depth subtraction processing. The example lidar map 801 and/or the example lidar map 802 may be provided to a CNN and used to train the CNN to predict target depth maps as output, based on input radar frames acquired from, for example, a 1-D horizontal antenna array.

Figure 9:
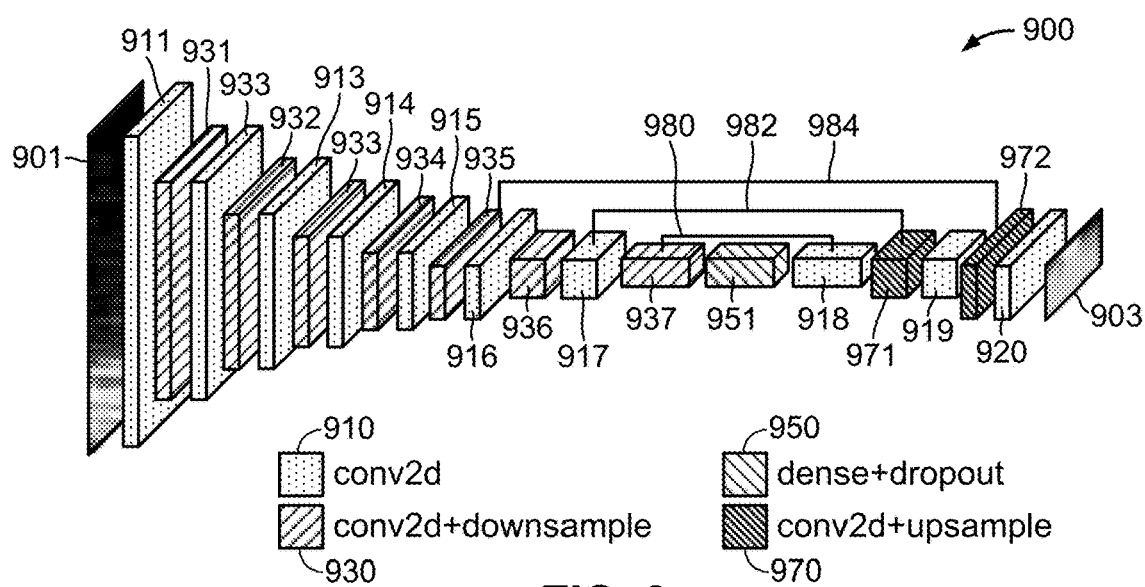
FIG. 9 illustrates an example processing sequence for generating a predicted target depth map.

FIG. 9 illustrates an example processing sequence 900 for generating a predicted target depth map. The processing sequence 900 may begin with an input radar frame 901 and conclude with a predicted target depth map 903. The radar frame input 901 and predicted target depth map 903 may correspond respectively to, for example, the radar frame input 701 and predicted target depth map 703 depicted in FIG. 7, or any of the frames and inputs described below with reference to FIGS. 10A-F. The processing sequence 900 includes processing at a plurality of layers between the radar frame input 901 and the predicted target depth map 903. Each layer may be a convolutional layer (indicated by a convolutional layer indicator 910), a downsampled layer (indicated by a downsampling indicator 930), a dropout layer (indicated by a dropout layer indicator 950), or an upsampled layer (indicated by an upsampling indicator 970).

According to the example processing sequence 900, the radar frame input 901 may be processed to generate a convolutional layer 911, which is downsampled to generate a downsampled layer 931. This two-layer operation may be repeated several times further, such that the downsampled layer 931 is used to generate a convolutional layer 912, the convolutional layer 912 is used to generate a downsampled layer 932, the downsampled layer 932 is used to generate a convolutional layer 913, the convolutional layer 913 is used to generate a downsampled layer 934, the downsampled layer 934 is used to generate a convolutional layer 915, the convolutional layer 915 is used to generate a downsampled layer 935, the downsampled layer 935 is used to generate a convolutional layer 916. At this point, the convolutional layer 916 matches the size of the predicted target depth map, 903. The convolutional layer 916 is used to generate a downsampled layer 936, the downsampled layer 936 is used to generate a convolutional layer 917, and the convolutional layer 917 is used to generate a downsampled layer 937.

As may be observed in FIG. 9, the downsampled layer 937 may then be used to generate a dropout layer 951, and the dropout layer 951 may be used to generate convolutional layer 918. The convolutional layer 918 may be used to generate upsampled layer 971, the upsampled layer 971 may be used to generate convolutional layer 919, the convolutional layer 919 may be used to generate upsampled layer 972, and the upsampled layer 972 may be used to generate a convolutional layer 920. The convolutional layer 920 may be used to generate the predicted target depth map 903. Skip connections 980, 982, 984, between corresponding layers of the encoder and the decoder may be used to preserve higher-frequency features. The skip connections 980, 982, 984, may be implemented at each stage by adding a tensor from the encoder layer to the corresponding tensor at the decoder layer.

In the example depicted in FIG. 9, the downsampling from convolutional layer 911 through the convolutional layer 916 may be performed with what is known as a stride of 2 in the range axis. That is, at each instance of downsampling, the downsampling is by a factor of 2 along the vertical, range axis; no downsampling—i.e., described as stride 1—along the horizontal, azimuth axis occurs.

According with an aspect, each downsampling instance includes a concatenation of a 3×1 convolutional layer with stride 2 along the range axis, and a 3×1 convolutional layer with stride 1 along the azimuth axis. The number of channels is kept constant, at 32. It should be appreciated that a channel in this context may be regarded as a CNN filter, or variable, corresponding to a particular feature. Thus, up to 32 features may be filtered by each convolutional layer. The approach utilizing concatenated layers with small filters allows for a wider receptive field when compared to a single, large filter. As mentioned, the sequence of layers downsamples the original input radar frame to match the predicted target depth map 903.

It will be appreciated that other levels of downsampling, at other strides, may be applied in accordance, for example, with system requirements and/or imaging parameters. It should be observed, too, that the dimensions of the downsampled layer 934 and convolutional layer 916 match those of the predicted target depth map 903, as well the upsampled layer 972 and convolutional layer 920.

As is further discussed below with regard to FIG. 14, the operations beginning at convolutional layer 916 and ending with convolutional layer 920 are regarded herein as an encoder-decoder portion of the overall processing sequence 900. In accordance with embodiments disclosed herein, the downsampled layer 937 may also be described as a dense layer. Also, downsampled layer 937, dropout layer 951, and convolutional layer 918, may be recognized as fully connected layers. Dropout layer 951 is so named for its regularizing function to randomly remove variables of the CNN during training. It should be observed that the arrangement of layers in the encode-decoder portion of the processing sequence 900 exhibit a mirror-like symmetry. That is, convolutional layer 916 mirrors ups ampled layer 972, convolutional layer 917 mirrors upsampled layer 971, and downsampled layer 937 mirrors convolutional layer 918. As mentioned above, another aspect provides for skip connections 980, 982, 984, between the corresponding, symmetrical layers between encoding and decoding layers to preserve higher frequency features. These skip connections 980, 982, 984, are depicted in FIG. 9 as horizontally oriented brackets, and are implemented by adding the tensor from the encoder layer to the corresponding tensor of the corresponding decoder layer.

The input radar frame 901 may be acquired using a radar sensor with a 1-D horizontal antenna array, and include at least range information and azimuth information. In particular, the horizontal axis of the radar frame 901 may represent azimuth information, in the form of a plurality of azimuth values, and the vertical axis may represent range information, in the form of a plurality of range values. The predicted target depth map 903, includes a horizontal axis representing a plurality of azimuth values, a vertical axis representing a plurality of elevation values, with a plurality of target depths assigned to a corresponding plurality of azimuth-elevation pairs.

FIGS. 10A-F illustrate radar frame inputs, lidar depth maps, predicted target depth maps generated in accordance with aspects of the disclosure, and camera frames corresponding to six different scenarios. Further details may be found, for example, on pages 4-5 of Appendix A.

Figure 10A:
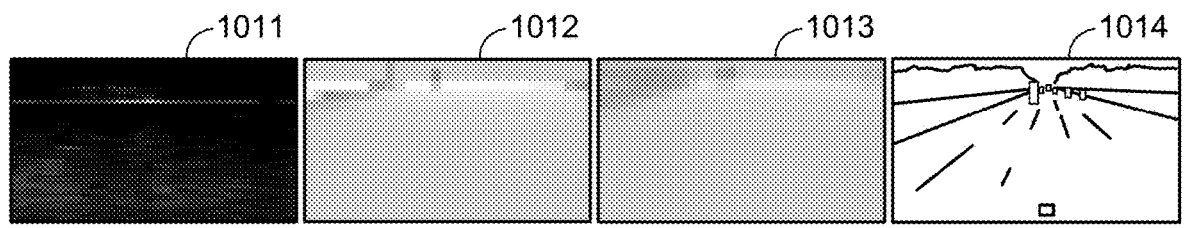
FIG. 10A illustrates an example implementation associated with a first scenario.

FIG. 10A illustrates an example implementation associated with a first scenario. Similar to FIG. 7, the example implementation of FIG. 10A includes a radar frame input 1011, a (ground-truth) lidar depth map 1012, and a predicted target depth map 1013 that is generated based on the radar frame input 1011 in accordance with aspects of the disclosure. For purposes of illustration, FIG. 10A further includes a camera frame 1014 showing this first scenario in which the radar frame input 1011 and lidar depth map 1012 are captured. In particular, the first scenario includes a single car at a distance of approximately 30 meters, with a guard rail/wall on the left. As may be observed in FIG. 10A, the predicted target depth map 1013 is comparable to the lidar depth map 1012. It should be understood that the camera frame 1014 is not involved in the generation of the predicted target depth map 1013.

Figure 10B:
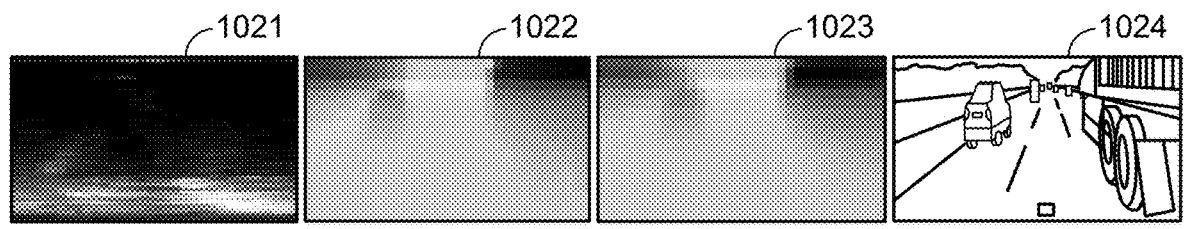
FIG. 10B illustrates an example implementation associated with a second scenario.

FIG. 10B illustrates an example implementation associated with a second scenario. Similar to FIG. 10A, FIG. 10B depicts a radar frame input 1021, a (ground-truth) lidar depth map 1022, a predicted target depth map 1023, and an bounding box 1024. As may be observed in camera frame 1024, FIG. 10B represents a different scenario than FIG. 10A. In particular, the second scenario exemplified by FIG. 10B includes, from left to right, a roadside embankment, a car, and a truck. As will be understood from FIG. 10B, the predicted target depth map 1023 is comparable to the lidar depth map 1022.

Figure 10C:
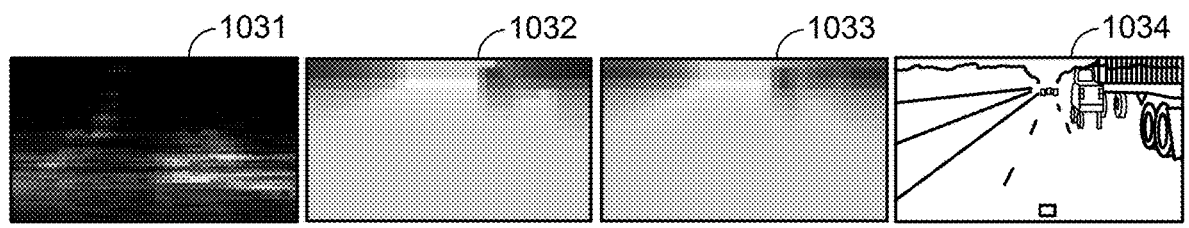
FIG. 10C illustrates an example implementation associated with a third scenario.

FIG. 10C illustrates an example implementation associated with a third scenario. Similar to FIG. 10A, FIG. 10C includes a radar frame input 1031, a (ground-truth) lidar depth map 1032, a predicted target depth map 1033, and an associated camera frame 1034. As will be understood from the camera frame 1034, FIG. 10C represents a scenario yet different from that of FIG. 10A. In particular, the third scenario depicted by FIG. 10C includes a car and a large truck, the car partially occluding the truck. As may be observed in FIG. 10C, the predicted target depth map 1033 is comparable to the lidar depth map 1032.

Figure 10D:
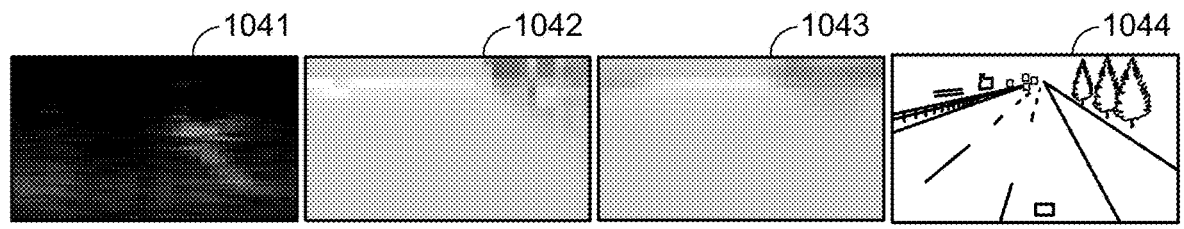
FIG. 10D illustrates an example implementation associated with a fourth scenario.

FIG. 10D illustrates an example implementation associated with a fourth scenario. Similar to FIG. 10A, FIG. 10D includes a radar frame input 1041, a (ground-truth) lidar depth map 1042, a predicted target depth map 1043, and an associated camera frame 1044. As will be understood from the camera frame 1044, FIG. 10D represents a further different scenario from FIG. 10A. In particular, the fourth scenario, as represented in FIG. 10D, includes no vehicles within the range of the radar sensor, but includes extensive brush on the right. As will be understood from FIG. 10D, the predicted target depth map 1043 is comparable to the lidar depth map 1042.

Figure 10E:
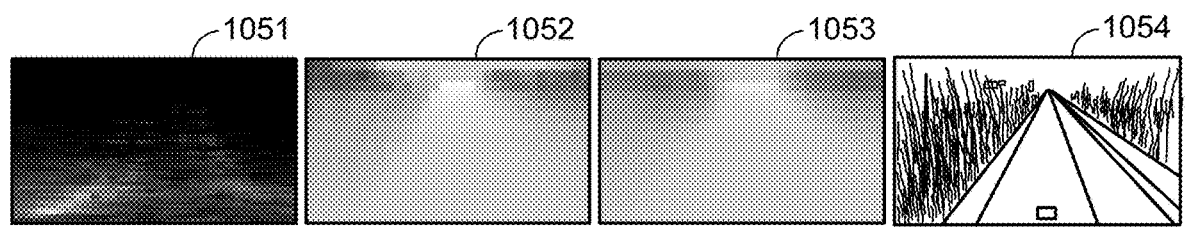
FIG. 10E illustrates an example implementation associated with a fifth scenario.

FIG. 10E illustrates an example implementation associated with a fifth scenario. Similar to FIG. 10A, FIG. 10E includes a radar frame input 1051, a (ground truth) lidar depth map 1052, a predicted target depth map 1053, and an associated camera frame 1054. As may be observed in the camera frame 1054, FIG. 10E represents another, different scenario than FIG. 10A. In particular, FIG. 10E represents a scenario in which no vehicles within the range of the radar sensor are included, but in which tall roadside embankments are present. As may be observed in FIG. 10E, the predicted target depth map 1053 is comparable to the lidar depth map 1052.

Figure 10F:
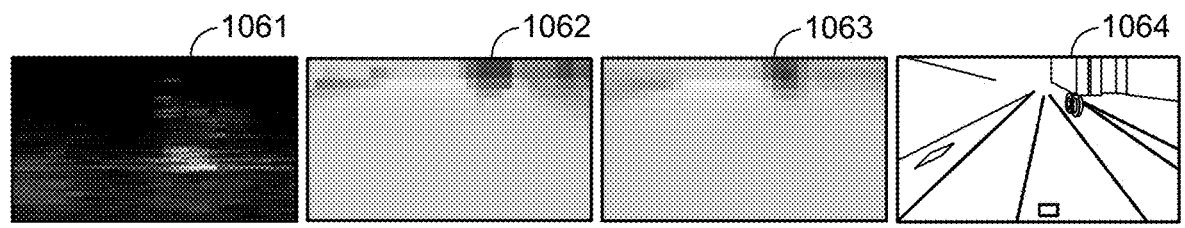
FIG. 10F illustrates an example implementation associated with a sixth scenario.

FIG. 10F illustrates an example implementation associated with a sixth scenario. Similar to FIG. 10A, FIG. 10F includes a radar frame input 1061, a (ground-truth) lidar depth map 1062, a predicted target depth map 1063, and an associated camera frame 1064. As may be observed in the camera frame 1064, FIG. 10F represents a different scenario than FIG. 10A. In particular, the sixth scenario represented in FIG. 10F includes a large truck underneath a bridge, and a pillar against the wall under the bridge. As will be understood from FIG. 10F, the predicted target depth map 1063 is comparable to the lidar depth map 1062, though the lidar depth map 1062 does not indicated a detection of the pillar.

Figure 11:
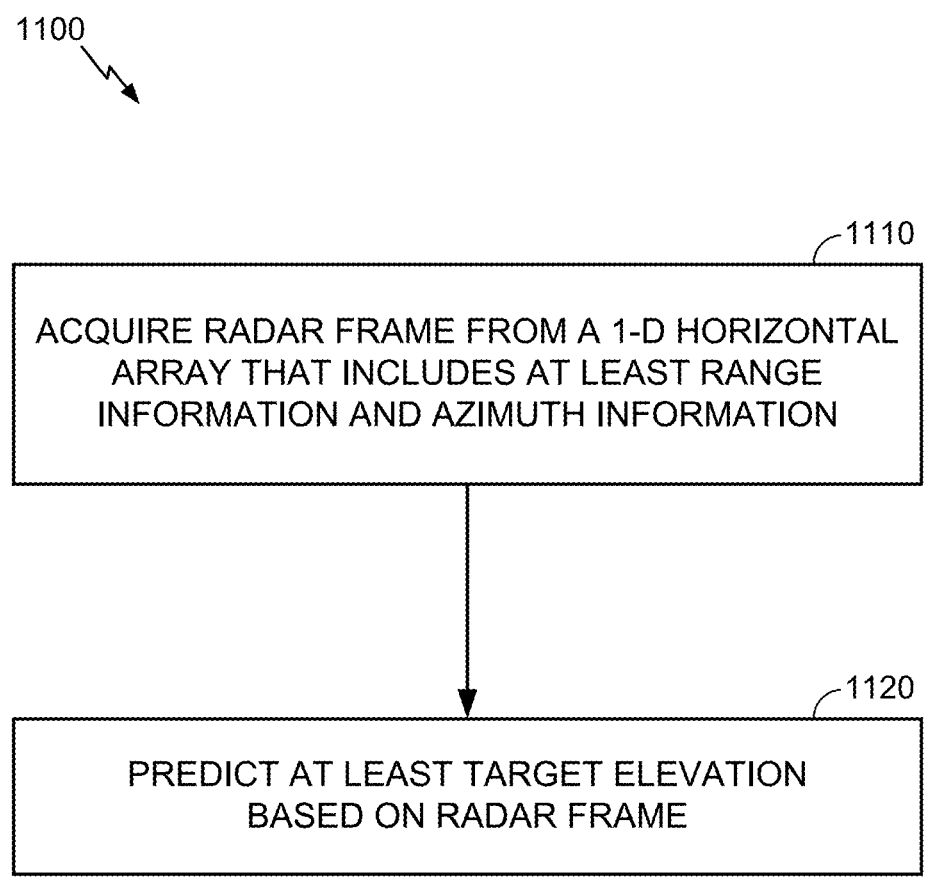
FIG. 11 illustrates an example method for resolving elevation ambiguity in accordance with aspects of the disclosure.

FIG. 11 illustrates an example method 1100 for resolving elevation ambiguity. At block 1110, the method acquires a radar frame that includes at least range information and azimuth information. The radar frame may be analogous to any of the radar frames described above (for example, the radar frame input 701, the radar frame input 901, the radar frame input 1011, etc.). The radar frame may be acquired at block 1110 using, for example, the radar sensor 214 depicted in FIG. 2. The radar frame may optionally include Doppler information. The radar frame acquired at block 1110 may be provided, for example, to the OBC 200 for further processing.

At block 1120, the method predicts at least a target elevation based on the radar frame acquired at 1110. The predicting at 1120 may be performed by, for example, the OBC 200 depicted in FIG. 2. The predicting at 1120 may be performed also in accordance with the system 1500 depicted in FIG. 15, and in accordance with the processing sequence 900 disclosed in the discussion regarding FIG. 9.

Figure 12:
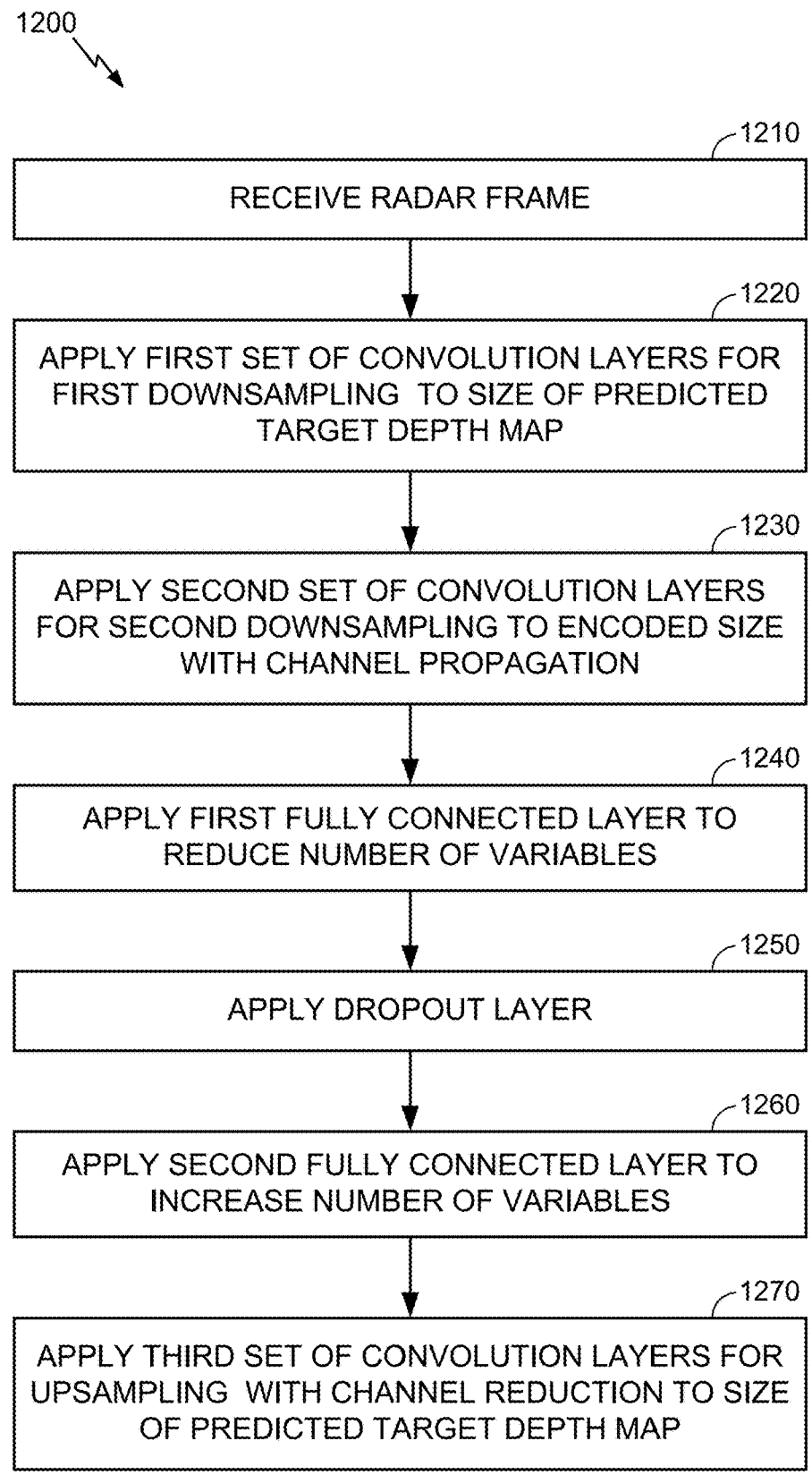
FIG. 12 illustrates an example method for computing a target depth map in accordance with aspects of the disclosure.

FIG. 12 illustrates an example method 1200 for computing a predicted target depth map in accordance with aspects of the disclosure. The method 1200 should be recognized as relating to the processing sequence 900, of FIG. 9, and to the system 1400 for resolving an elevation ambiguity in 1-D radar data, of FIG. 14. As shown, at block 1210, an input radar frame may be received. The radar frame may correspond with, for example, the radar frame input 901, the radar frame input 701, or any of the input radar frames described with regard to FIGS. 10A-F. In an illustrative example, the radar frame may be dimensioned at 512×32. That is, the horizontal azimuth axis has 32 bins, and the vertical range axis has 512 bins. At block 1220, a set of convolution layers are applied for a first downsampling to a size of the predicted target depth map of the process. The predicted depth map may correspond with predicted target depth map 903, of FIG. 9, and predicted target depth map 1475, of FIG. 14. As shown in FIG. 9, downsampled layer 935 and convolution layer 916 may be of the same size as the predicted target depth map 903 (and, hence, target depth map 1475), as well as upsampled layer 972 and convolution layer 920. Per the present example, the radar frame at 512×32 is therefore downsampled to a 16×32 size for the predicted target depth map, for which the horizontal azimuth axis has 32 bins and the vertical elevation axis has 16 bins.

In an embodiment, and in reference to FIG. 9, the set of convolution layers referred to and applied at block 1220 may include convolution layer 911, followed by a cascade of layer pairs comprising a downsampled layer and convolution layer. This cascade of layer pairs may correspond with the two-layer operations described in regard to FIG. 9. The final layer pair of the cascade may correspond, for example, with downsampled layer 935 and convolution layer 916, where the size of convolution layer 916 matches that of the predicted target depth map 903. It is contemplated herein that more, or fewer, layer pairs may be implemented in accordance, for example, with system requirements. In the present illustrative example, the downsampling by the set of layer pairs is performed with stride 2 along the vertical range axis, and with stride 1 along the horizontal azimuth axis. That is, the range is downsampled by 2 at every instance, while the azimuth remains unchanged. Therefore, the downsampled layer 931 would be 256×32, the downsampled layer 932 would be 128×32, the downsampled layer 933 would be 64×32, the downsampled layer 934 would be 32×32, and the downsampled layer 935 would be 16×32, matching the size of the predicted target depth map. As discussed with regard to FIG. 9, for each applicable layer to block 1220, a constant number of channels is maintained. A channel may be regarded as a filter in the CNN for a particular feature, and in the context of the present illustrative example, the number of channels is kept constant, at 32. It will be appreciated that the image and layer sizes set forth above by example are not limiting, and that other image and layer sizes are equally applicable to the methods, processes, and apparatus disclosed herein. Further, the pluralities of the various layers may also number differently, and not be limited to the number of layers set forth in the examples and embodiments disclosed herein.

One of skill in the art will appreciate that various implementations for cascading the layer pairs are possible. For example, an embodiment provides that the layer pairs of block 1220 may be implemented as a sequence of instances of discrete functional structures, each layer pair allocated and configured for operation in a sequence of separate layer pairs, each comprising a downsampled and a convolutional layer.

In an embodiment, a layer pair comprising a downsampled layer, such as downsampled layer 931, and a convolutional layer, such as convolutional layer 912 (referring again to FIG. 9), may be allocated and/or configured in an iterative manner Such a processing architecture may yield beneficial savings in memory usage, though at a trade-off to added processing. In this case, for example, downsampled layer 931 and convolutional layer 912 may be instantiated and used for processing, after which downsampled layer 932 and convolutional layer 913 may be instantiated and used in place of the previous layer pair, and so on, until downsampled layer 935 and convolutional layer 916 are instantiated and used, thus ending the downsampling sequence. Again, the final convolution layer size matches that of the predicted target depth map, such as predicted target depth map 903. This iterative approach is discussed also with regard to FIG. 14. One skilled in the art should appreciate, in any case, that there are many other implementation possibilities for the processing of block 1220, and it is contemplated herein that none should lie beyond the intended scope of this disclosure.

At block 1230, a second set of convolution layers is applied for a second downsampling to encoded size, this time across two dimensions, and with channel propagation. Similar to the processing of block 1220, a downsampled layer and a convolution layer, such as downsampled layer 936 and a convolution layer 917, are used, but now as part of an encoder. Again referring also to FIG. 9, downsampled layer 936, convolution layer 917, and downsampled layer 937 may function to downsample the image (i.e., processed radar frame) in both the azimuth and range dimensions to a size amenable with fully connected neural net operations. Continuing the present illustrative example, the downsampled layer may be downsampled from 16×32 to 8×16 at downsampled layer 936, and to 4×8 at downsampled layer 937. Thus, the downsampling is by a factor of 2 along both horizontal and vertical axes.

At each downsampling, a propagation of the channels (variables) may be performed, such that downsampling by a factor of 2 results in an increase in the number of channels by the same factor, 2. Accordingly, downsampling from 16×32 to 8×16 includes a channel increase from 32 to 64, and downsampling from 8×16 to 4×8 includes a further channel increase from 64 to 128. Thus, at the output of the downsampling to 4×8, there are 128 channels, and a total of 4*8*128=4096 variables.

At block 1240, a first fully connected layer is applied to reduce the number of variables. The first fully connected layer may correspond with downsampled layer 937 of FIG. 9. As just discussed in regard to the present example, there may be 4096 variables at the first fully connected layer, the number of which is reduced to 512 variables. The first fully connected layer may also be referred to as a dense layer, and should be understood as capable of learning global variables by virtue of its full connectedness, contrasting with the convolutional layers used for downsampling and, later, upsampling.

At block 1250, a dropout layer may be applied, which in the context of the present illustrative example may randomly reduce the number of active variables by 50%. This reduction may also be regarded as a regularization, which will be understood to mitigate overfitting of data by the neural network as the removal of the variables forces the network not to rely upon specific variables, thereby improving robustness. The dropout layer may correspond with dropout layer 951, of FIG. 9.

At block 1260, a second fully connected layer is applied to increase the number of variables. This layer may correspond with convolutional layer 918, and per the present example may restore the number of variables from 512 back to 4096.

It should be appreciated that the use of fully connected layers, such as performed by blocks 1240, 1250, and 1260, differs from most standard implementations of a CNN. The fully connected layers allow the network, generally, to learn global features, and the dropout layer (block 1250) improves generalization.

At block 1270, a third set of convolutional layers is applied for upsampling with channel reduction to the size of the predicted target depth map. The layers at this stage behave as a decoder, and generally mirror the operations of the encoder side, such as described in the discussion of block 1230. The layers involved may correspond with upsampled layer 971, convolutional layer 919, upsampled layer 972, and convolutional layer 920.

At each upsampling, a reduction of the number of channels may be performed, such that upsampling by a factor of 2 results in a decrease in the number of channels by the same factor, 2. Accordingly, upsampling from 4×8 to 8×16, e.g., at upsampled layer 971, includes a channel decrease from 128 to 64, and upsampling from 8×16 to 16×32, e.g., at upsampled layer 972, includes a channel decrease from 64 to 32. It should be understood that the operations of the skip connections 980, 982, 984, discussed with regard to FIG. 9, may be in effect as well in the operations of blocks 1260 and 1270.

Figure 13:
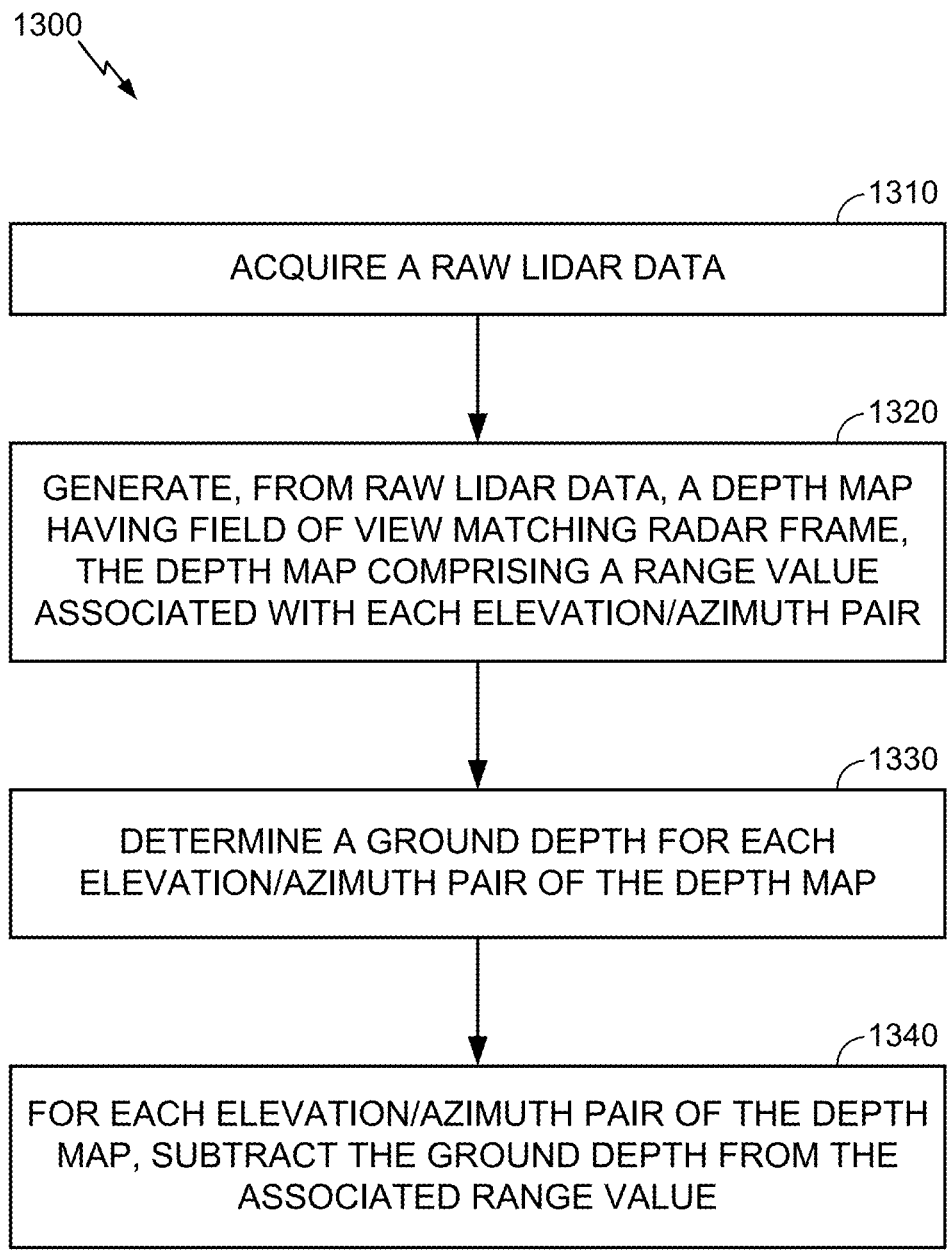
FIG. 13 illustrates an example method for generating ground-truth depth maps in accordance with aspects of the disclosure.

FIG. 13 illustrates an example method 1300 of generating ground-truth depth maps in accordance with aspects of the disclosure. Ground-truth information is required for training the CNN. Sensors for measuring ground-truth depth maps include, but are not limited to, lidar, 2-D radar imaging, and infra-red (IR). Lidar, for example, utilizes lasers at different elevation angles to measure depth as a function of azimuth. 2-D radar ranging and IR systems may similarly measure range (depth) at different elevations and azimuths.

The dynamic range of a lidar depth map is typically quite high because rays from lower lasers usually travel a shorter distance until they hit the road surface, for instance. By contrast, the rays from the higher lasers travel longer distances. To reduce this dynamic disparity, a ground-depth subtraction may be performed, as briefly mentioned with regard to FIG. 8. Assuming that the ground is perfectly flat, and using the known sensor height, a distance from the lidar to the ground may be determined for each laser ray direction. These quantities may then be subtracted from corresponding lidar depth map entries, resulting in a compensated depth map for use as ground-truth in a training phase of the CNN.

At block 1310, raw lidar sensor data may be acquired. In the lidar data, azimuth runs horizontally, and elevation runs vertically. At block 1320, a depth may be generated, having a field view matching a radar frame (such as may be received at block 1210 of FIG. 12), where the depth map comprises a range value associated with each elevation/azimuth pair. At 1330, a ground depth for each elevation/azimuth pair of the depth map is determined, as discussed above. At 1340, for each elevation/azimuth pair of the depth map, the associated ground depth value is subtracted from the associated range value, resulting in a compensated depth map, which may be optionally used for training.

Figure 14:
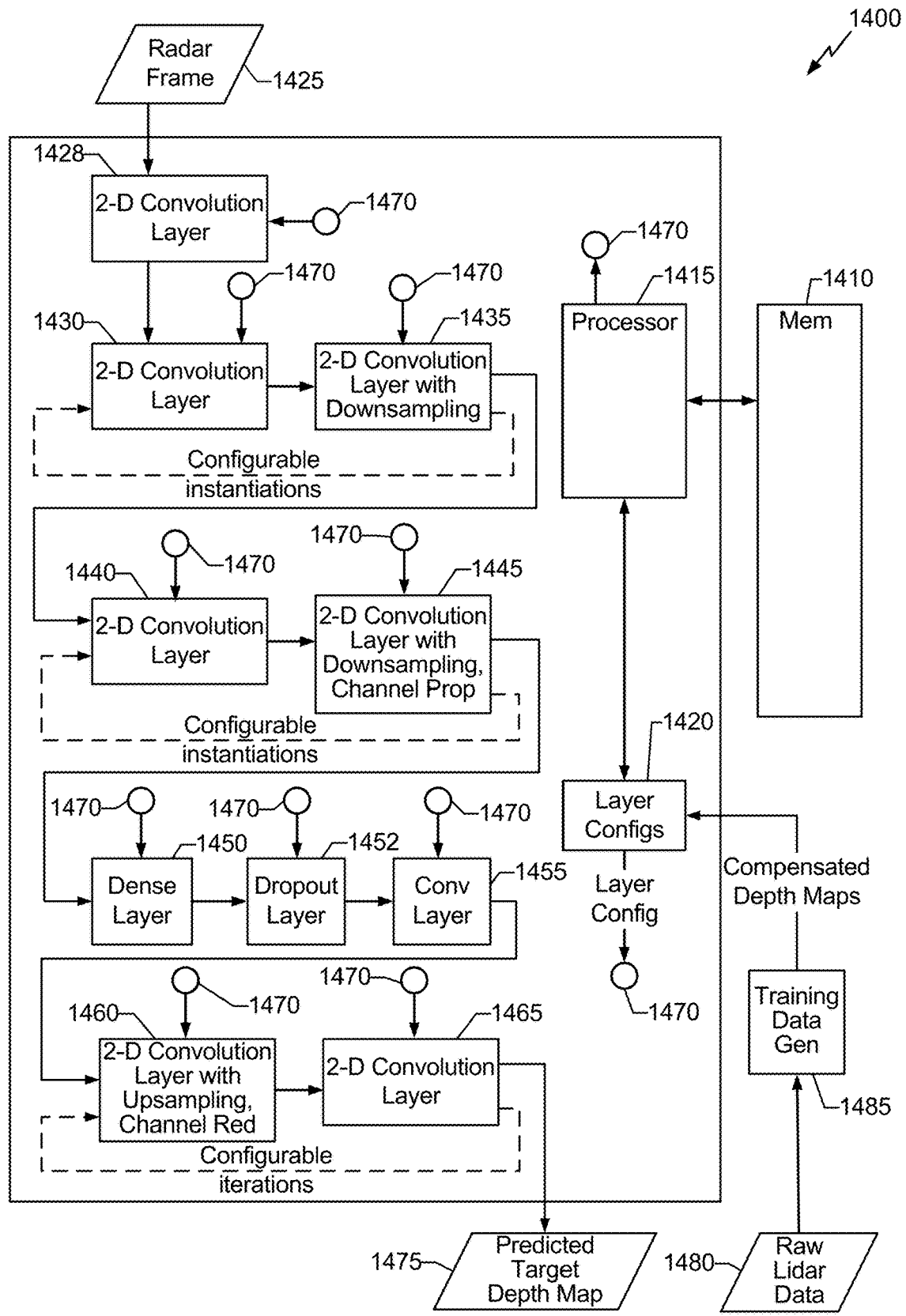
FIG. 14 is a functional block diagram illustrating an example system for resolving an elevation ambiguity in 1-D radar data in accordance with aspects of the disclosure.

FIG. 14 is a functional block diagram illustrating an example system 1400 for resolving an elevation ambiguity in 1-D radar data in accordance with aspects of the disclosure. It will be recognized that the structure/architecture of the functional blocks track operations disclosed with regard to the method of FIG. 12, and elements of the processing sequence 900 of FIG. 9. For brevity, various descriptions of function blocks of FIG. 14 may refer to similar elements of FIGS. 9 and/or 12. Further, elements of FIG. 14 may correspond with like elements of FIG. 2. It will be understood by one of skill in the art that the various blocks and elements depicted in FIG. 14 may be regarded conceptually, and be implemented in a variety of ways not explicitly depicted The system 1400 includes a processor 1415, which may correspond with the one or more processors 206 of FIG. 2, and a memory 1410, which may similarly correspond with memory 204, also of FIG. 2. It will be appreciated that memory 204 may comprise multiple memory blocks, depending upon implementation. The processor 1415 may be communicatively coupled with a layer configuration module 1420, and a data bus 1470. The layer configuration module 1420 may also be coupled with the data bus 1470, as well as a training data generator 1485.

Several various modules are also coupled with the data bus 1470, and may be referred to variously simply as layers with no loss of clarity. Accordingly, coupled with the data bus 1470 are 2-D convolution layer 1428, 2-D convolution layer 1430, 2-D convolution layer with downsampling 1435, 2-D convolution layer 1440, 2-D convolution layer with downsampling 1445, dense layer 1450, dropout layer 1452, convolution layer 1455, 2-D convolution layer with upsampling 1460, and 2-D convolution layer 1465.

In an embodiment, as depicted in FIG. 14, the processor 1415 may generally control the operation of the system 1400. The memory 1410 may be a computer readable medium configured to store computer program instructions and data. The various layer modules are depicted separately from the memory 1410, but it will be appreciated that they may be implemented in software or firmware in dedicated processing modules, on-board the processor 1415, or in the memory 1410.

A radar frame 1425 may be received and applied to 2-D convolution layer 1428. In accordance with the illustrative example discussed with regard to FIG. 12, the radar frame 1425 may be of dimension 512×32, and 1428 may correspond with layer 911, also at 512×32. The output of layer 1428 is applied to 2-D convolution layer 1430, which outputs to 2-D convolution layer with downsampling 1435. An optional feedback loop enabling configurable instantiations of layer 1430 and layer 1435 is provided. As such, layer 1430 and layer 1435 may be iteratively reconfigured to operate as do layers 931, 912, 932, 913, 933, 914, 934, 915, 935, and 916, of FIG. 9. Layer configuration data generated at the layer configuration module 1420 may be provided via the data bus 1470 to the various layer modules, thus enabling the iterative reconfiguration. Referring to the discussion of block 1220 of FIG. 12, it will be appreciated again that this iterative approach implementing, essentially, the operation of block 1220 represents but one possibility of many.

Per the continuing illustrative example, the output of the last instantiation layer 1435 may match in size with the predicted target depth map, in this case, 16×32. That output may then be applied to 2-D convolution layer 1440, whose output may be applied to 2-D convolution layer with downsampling and channel propagation 1445. Again, iterative reconfigurations are enabled by a feedback loop and layer configuration data via the data bus 1470, similar to that described above. Layer 1440 and layer 1445 may correspond respectively with layers 936 and 917 of FIG. 9. As such, the output of layer 1445 may be of dimension 8×16 with an increase in channel number to 64.

The output of layer 1445, at 8×16 with 64 channels, may then be applied to dense layer 1450, a fully connected layer that may correspond with downsampled layer 937 of FIG. 9, to perform a downsampling of stride 2 in two dimensions, resulting in dimensions of 4×8 with 128 channels. There may then be 4096 variables present at layer 1450, which is reduced to 512 variables. The 4×8 output with 512 variables is applied to the fully connected dropout layer 1452, at which, for example, 50% of the variables may be randomly removed. The output of dropout layer 1452 may then be applied to fully connected convolution layer 1455, which may restore the number of variables from 512 back to 4096.

The output from convolution layer 1455 may then be applied to 2-D convolution layer with upsampling and channel reduction 1460, whose output may be 8×16 with 64 channels, per the present example. That output may be applied to 2-D convolution layer 1465. A feedback loop is contemplated, as discussed with layers 1430 and 1435, and layers 1440 and 1445, enabling iterative reconfiguration of layers 1460 and 1465, using layer configuration data received from the layer configuration module 1420 via data bus 1470. Accordingly, layers 1460 and 1465 may correspond with layers 971 and 919, respectively, and layers 972 and 920, respectively. As shown, the output of layer 1465 is the predicted target depth map 1475, comprising an array/image of depths assigned to each elevation/azimuth pair.

Training data generator 1485 may receive raw lidar data. In other embodiments, the received data may be produced by a 2-D radar sensor, or an IR sensor. The raw lidar data 1480 are processed to determine ground-depth information and then subtract it from the lidar data, thus generating a compensated depth map, as discussed above with regard to FIG. 13. The compensated depth map may then be provided to the layer configuration module 1420, at which training weight sets may be determined and provided to the layers via the data bus 1470. One of skill in the art will appreciate that training neural nets and CNNs is a known process, and need not be elaborated in this disclosure.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on". Moreover, the phrase "coupled to" in electrical contexts encompasses any suitable method for delivering an electrical signal from a first node to a second node. As such, "coupled to" may encompass "coupled directly to" (for example, by direct conductive connection, such as with a copper wire, a solder ball, etc.) as well as "coupled indirectly to" (for example, having one or more intervening structures therebetween, such as a switch, a buffer, a filter, etc.). It will be further understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of resolving elevation ambiguity in the use of one-dimensional (1-D) radar sensor data, comprising:
    acquiring, from a radar sensor using a 1-D horizontal antenna array, a radar frame that includes at least range information and azimuth information; and
    predicting at least a target elevation based on the radar frame by computing a depth map, wherein the depth map includes a plurality of target depths, the computing of the depth map includes processing the radar frame with an encoder-decoder structured deep convolutional neural network (CNN) by applying a set of convolutional layers to downsample the radar frame to a size of the depth map, and the plurality of target depths is assigned to a corresponding plurality of azimuth-elevation pairs, wherein the encoder-decoder structured deep CNN is trained using a dataset that includes:
    a plurality of training radar frames acquired in one or more of a plurality of particular environments; and
    a plurality of compensated ground truth depth maps associated with the one or more of a plurality of particular environments.

2. The method of claim 1, wherein each of the plurality of compensated ground truth depth maps is generated by subtracting a ground-depth from a corresponding ground truth depth map of the plurality of ground truth depth maps.

3. The method of claim 2, wherein the plurality of ground truth depth maps is acquired using a two-dimensional (2-D) range sensor.

4. The method of claim 3, wherein the 2-D range sensor comprises a LiDAR sensor.

5. The method of claim 3, wherein the 2-D range sensor comprises 2-D radar sensor.

6. The method of claim 3, wherein the 2-D range sensor comprises an infra-red (IR) sensor.

7. The method of claim 1, wherein the radar frame further includes Doppler information.

8. An apparatus, comprising:
    at least one memory configured to store data and/or instructions; and
    at least one processor coupled to the at least one memory, the at least one processor configured to:
    acquire, from a radar sensor using a one-dimensional (1-D) horizontal antenna array, a radar frame that includes at least range information and azimuth information; and
    predict at least a target elevation based on the radar frame by computing a depth map, wherein the depth map includes a plurality of target depths, the computing of the depth map includes processing the radar frame with an encoder-decoder structured deep convolutional neural network (CNN) by applying a set of convolutional layers to downsample the radar frame to a size of the depth map, and the plurality of target depths is assigned to a corresponding plurality of azimuth-elevation pairs, wherein the encoder-decoder structured deep CNN is trained using a dataset that includes:
    a plurality of training radar frames acquired in one or more of a plurality of particular environments; and
    a plurality of compensated ground truth depth maps associated with the one or more of a plurality of particular environments.

9. The apparatus of claim 8, wherein each of the plurality of compensated ground truth depth maps is generated by subtracting a ground-depth from a corresponding ground truth depth map of the plurality of ground truth depth maps.

10. The apparatus of claim 9, wherein the plurality of ground truth depth maps is acquired using a two-dimensional (2-D) range sensor.

11. The apparatus of claim 10, wherein the 2-D range sensor comprises one or more of a LiDAR sensor, a 2-D radar sensor, and an infra-red (IR) sensor.

12. The apparatus of claim 8, wherein the radar frame further includes Doppler information.

13. An apparatus, comprising:
    means for acquiring, from a radar sensor using a one-dimensional horizontal antenna array, a radar frame that includes at least range information and azimuth information; and
    means for predicting at least a target elevation based on the radar frame by computing a depth map, wherein the depth map includes a plurality of target depths, the computing of the depth map includes processing the radar frame with an encoder-decoder structured deep convolutional neural network (CNN) by applying a set of convolutional layers to downsample the radar frame to a size of the depth map, and the plurality of target depths is assigned to a corresponding plurality of azimuth-elevation pairs, wherein the encoder-decoder structured deep CNN is trained using a dataset that includes:
    a plurality of training radar frames acquired in one or more of a plurality of particular environments; and
    a plurality of compensated ground truth depth maps associated with the one or more of a plurality of particular environments.

14. The apparatus of claim 13, wherein each of the plurality of compensated ground truth depth maps is generated by subtracting a ground-depth from a corresponding ground truth depth map of the plurality of ground truth depth maps.

15. The apparatus of claim 14, wherein the plurality of ground truth depth maps is acquired using a two-dimensional (2-D) range sensor.

16. A non-transitory computer-readable medium storing computer-executable instructions that, when executed by a processor, causes the processor to
    acquire, from a radar sensor using a one-dimensional (1-D) horizontal antenna array, a radar frame that includes at least range information and azimuth information; and
    predict at least a target elevation based on the radar frame by computing a depth map, wherein the depth map includes a plurality of target depths, the computing of the depth map includes processing the radar frame with an encoder-decoder structured deep convolutional neural network (CNN) by applying a set of convolutional layers to down sample the radar frame to a size of the depth map, and the plurality of target depths is assigned to a corresponding plurality of azimuth-elevation pairs, wherein the encoder-decoder structured deep CNN is trained using a dataset that includes:

a plurality of training radar frames acquired in one or more of a plurality of particular environments; and a plurality of compensated ground truth depth maps associated with the one or more of a plurality of particular environments.

17. The non-transitory computer-readable medium of claim 16, wherein each of the plurality of compensated ground truth depth maps is generated by subtracting a ground-depth from a corresponding ground truth depth map of the plurality of ground truth depth maps.

18. The non-transitory computer-readable medium of claim 17, wherein the plurality of ground truth depth maps is acquired using a two-dimensional (2-D) range sensor.

\* \* \* \* \*